US009011809B2

(12) United States Patent
Ito et al.

(10) Patent No.: US 9,011,809 B2
(45) Date of Patent: *Apr. 21, 2015

(54) AMMONIA OXIDATION CATALYST, EXHAUST GAS PURIFICATION DEVICE USING SAME, AND EXHAUST GAS PURIFICATION METHOD

(75) Inventors: Tomoaki Ito, Shizuoka (JP); Toshinori Okajima, Shizuoka (JP); Takashi Hihara, Shizuoka (JP); Makoto Nagata, Shizuoka (JP)

(73) Assignee: N.E. Chemcat Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/008,349

(22) PCT Filed: Feb. 24, 2012

(86) PCT No.: PCT/JP2012/054518
§ 371 (c)(1),
(2), (4) Date: Oct. 28, 2013

(87) PCT Pub. No.: WO2012/132678
PCT Pub. Date: Oct. 4, 2012

(65) Prior Publication Data
US 2014/0044635 A1      Feb. 13, 2014

(30) Foreign Application Priority Data

Mar. 31, 2011  (JP) .................. 2011-077186

(51) Int. Cl.
*B01D 53/56*  (2006.01)
*B01D 53/86*  (2006.01)
(Continued)

(52) U.S. Cl.
CPC .................. *B01J 29/88* (2013.01); *Y02C 20/10* (2013.01); *B01D 53/9436* (2013.01);
(Continued)

(58) Field of Classification Search
CPC ............ B01J 21/00; B01J 21/04; B01J 21/06; B01J 21/08; B01J 21/12; B01J 23/00; B01J 23/10; B01J 23/30; B01J 23/40; B01J 23/42; B01J 23/63; B01J 23/64; B01J 23/6527; B01J 29/00; B01J 29/068; B01J 29/076

USPC ........ 502/64–66, 73, 74, 261–263, 304, 305, 502/308, 309, 313, 326, 327, 332–334, 339, 502/349, 415, 439, 527.12, 527.13; 422/170, 177, 180; 423/239.1

See application file for complete search history.

(56) References Cited

U.S. PATENT DOCUMENTS 5,679,313 A     10/1997  Nojima et al.
7,541,310 B2 *   6/2009  Espinoza et al. .............. 502/326
(Continued)

FOREIGN PATENT DOCUMENTS

JP    07-328438 A    12/1995
JP    10-005591 A     1/1998
(Continued)

OTHER PUBLICATIONS

S. Verdier et al. "Acidic Zirconia Materials for Durable NH3-SCR deNOx Catalysts", SAE Technical Paper Series, 2008, SAE-2008-1-1022, p. 2, right column, lines 1-6; p. 3, left lines 15-21; Figures 9, 11; table 4.

(Continued)

*Primary Examiner* — Cam N. Nguyen
(74) *Attorney, Agent, or Firm* — Westerman, Hattori, Daniels & Adrian, LLP

(57) ABSTRACT

An ammonia oxidation catalyst being superior in heat resistance and capable of suppressing by-production of $N_2O$ or $NO_x$. The ammonia oxidation catalyst is made by coating at least two catalyst layers having a catalyst layer (lower layer) including a catalyst supported a noble metal on an inorganic base material including any of a composite oxide (A) having at least titania and silica as main components, alumina, and a composite oxide (B) consisting of alumina and silica; and a catalyst layer (upper layer) including a composite oxide (C) consisting of at least silica, tungsten oxide, ceria and zirconia, at the surface of an integral structure-type substrate, wherein a composition of the composite oxide (C) is silica: 20% by weight or less, tungsten oxide: 1 to 50% by weight, ceria: 1 to 60% by weight, and zirconia: 30 to 90% by weight.

21 Claims, 3 Drawing Sheets

(51) Int. Cl.
*B01J 8/00* (2006.01)
*C01B 21/00* (2006.01)
*B01J 29/00* (2006.01)
*B01J 29/06* (2006.01)
*B01J 21/00* (2006.01)
*B01J 21/04* (2006.01)
*B01J 23/00* (2006.01)
*B01J 23/02* (2006.01)
*B01J 23/10* (2006.01)
*B01J 23/40* (2006.01)
*B01J 23/42* (2006.01)
*B01J 23/56* (2006.01)
*B01J 20/00* (2006.01)
*B01D 50/00* (2006.01)
*B01D 53/34* (2006.01)
*B01J 29/88* (2006.01)
*B01D 53/94* (2006.01)
*B01J 23/63* (2006.01)
*B01J 37/02* (2006.01)
*B01J 35/00* (2006.01)
*B01J 21/06* (2006.01)
*B01J 21/08* (2006.01)
*B01J 23/44* (2006.01)
*B01J 29/72* (2006.01)
*B01J 35/04* (2006.01)

(52) U.S. Cl.
CPC .... *B01D 53/9477* (2013.01); *B01D 2255/1021* (2013.01); *B01D 2255/2065* (2013.01); *B01D 2255/20707* (2013.01); *B01D 2255/20715* (2013.01); *B01D 2255/20776* (2013.01); *B01D 2255/30* (2013.01); *B01D 2255/40* (2013.01); *B01D 2255/407* (2013.01); *B01D 2255/9022* (2013.01); *B01D 53/945* (2013.01); *B01J 23/63* (2013.01); *B01J 37/0244* (2013.01); *B01J 35/0006* (2013.01); *B01J 21/04* (2013.01); *B01J 21/063* (2013.01); *B01J 21/08* (2013.01); *B01J 23/42* (2013.01); *B01J 23/44* (2013.01); *B01J 29/7215* (2013.01); *B01J 35/04* (2013.01); *Y10S 502/52712* (2013.01); *Y10S 502/52713* (2013.01)

(56) References Cited

U.S. PATENT DOCUMENTS

| | | | |
|---|---|---|---|
| 7,601,670 B2* | 10/2009 | Yasuda et al. | 502/326 |
| 7,879,759 B2* | 2/2011 | Augustine et al. | 502/350 |
| 7,927,551 B2* | 4/2011 | Miyairi et al. | 422/168 |
| 7,968,492 B2* | 6/2011 | Augustine | 502/350 |
| 8,119,558 B2* | 2/2012 | Wagner et al. | 502/241 |
| 8,148,295 B2* | 4/2012 | Augustine | 502/350 |
| 8,153,549 B2* | 4/2012 | Cho et al. | 502/327 |
| 8,617,502 B2* | 12/2013 | Augustine et al. | 423/239.1 |
| 8,673,809 B2* | 3/2014 | Nakatsuji et al. | 502/327 |
| 2008/0271441 A1 | 11/2008 | Nagata et al. | |
| 2010/0111796 A1 | 5/2010 | Caudle et al. | |
| 2010/0196221 A1 | 8/2010 | Ando et al. | |
| 2011/0230338 A1* | 9/2011 | Augustine | 502/304 |

FOREIGN PATENT DOCUMENTS

| | | | |
|---|---|---|---|
| JP | 2002-502927 A | | 1/2002 |
| JP | 2004-524962 A | | 8/2004 |
| JP | 2005-185969 A | | 7/2005 |
| JP | 2005-238195 A | | 9/2005 |
| JP | 2008-279334 A | | 11/2008 |
| JP | 2008-282659 A | | 11/2008 |
| JP | 2008-296107 A | | 12/2008 |
| JP | 2010-115600 A | | 5/2010 |
| WO | 99/39809 A1 | | 8/1999 |
| WO | 02/072245 A2 | | 9/2002 |
| WO | 2010/062730 A2 | | 6/2010 |

OTHER PUBLICATIONS

International Search Report for PCT/JP2012/054518, Mailing Date of Apr. 17, 2012.
European Communication pursuant to Rule 164(1) EPC dated Nov. 11, 2014, w/partial supplementary European Search Report of European Patent Application No. 12764583.6 (5 pages).

* cited by examiner

AMMONIA OXIDATION CATALYST, EXHAUST GAS PURIFICATION DEVICE USING SAME, AND EXHAUST GAS PURIFICATION METHOD

TECHNICAL FIELD

The present invention relates to an ammonia oxidation catalyst, and an exhaust gas purification apparatus and an exhaust gas purification method using the same, and in more detail, the present invention relates to the ammonia oxidation catalyst, which is capable of effectively suppressing by-production of $N_2O$ or $NO_x$ and leakage of ammonia, is superior in heat resistance, has small pressure drop and is capable of reducing usage of a noble metal even under high space velocity (it may a also be referred to as SV), in purifying nitrogen oxide's (NO or $NO_2$) discharged from a lean-burn engine such as a boiler, a gas turbine, a lean burn-type gasoline engine, or a diesel engine, by spray supplying urea water or ammonia water, as a reducing component, onto a selective catalytic reduction; and the exhaust gas purification apparatus and the exhaust gas purification method using the same.

BACKGROUND ART

In exhaust gas discharged from a lean-burn engine such as a boiler, a gas turbine, a lean burn-type gasoline engine, or a diesel engine, various harmful substances derived from fuel or combustion air are included depending on a structure and a type thereof. Such harmful substances include a hydrocarbon (HC) a soluble organic fraction (it may also be called SOF), soot, carbon monoxide (CO), and nitrogen oxides ($NO_x$), and they are regulated by the Air Pollution Control Law. In addition, as a purification method thereof, there has been practically used a contact treatment method for purifying exhaust gas by making it contacted with a catalyst.

In addition, in such a lean burn engine, there may be the case where generation amount of the harmful substances such as CO and THC, which are incomplete combustion substances, is controlled by controlling combustion temperature, by operation such as supplying air of optimum amount for combustion, depending on kinds or supply amount of fuel; while, there may also be the case of incurring generation of $NO_x$ by increased combustion temperature. Such a state is similar also in an internal combustion engine, and in the case of a diesel engine, because of having a structure for operating an engine by lean-burn, the nitrogen oxides are easily discharged. Among them, in the case where a diesel engine loaded on an automobile, because operation condition thereof is always changing, it was extremely difficult to suitably suppress generation of the harmful substances.

As a purification method of the harmful substances discharged in this way, such a method has been widely investigated that installs a catalyst at an exhaust gas passage. There has been proposed a system of an oxidation catalyst aiming at purification of mainly SOP components; a catalyst aiming at oxidizing and purifying unburned gas components; or a catalyst for trapping, oxidizing and purifying the soot component, in combining them with a filter; although the catalyst to be used differs depending on the harmful components discharged from an engine, or an exhaust gas regulation. In these catalysts, a noble metal such as mainly Pt or Pd has been used to promote an oxidation reaction. Because the diesel engine has relatively larger displacement and more exhaust gas amount flown out, as compared with a gasoline engine or the like, volume of the catalyst also necessarily becomes larger, and amount of the noble metal to be used becomes more, to obtain sufficient purification performance, as compared with a catalyst for a gasoline engine or the like. A catalyst for the gasoline engine, where regulations of exhaust gas from an automobile have preceded, has also used the noble metal components conventionally, and accompanying with strengthening of exhaust gas regulations for the diesel engine, such a situation has appeared that a relatively rare and expensive noble metal, among resources on the earth, has been used more and more.

Additionally, accompanying with the exhaust gas regulation of $NO_x$, a catalyst system using a $NO_x$ storage catalyst or a selective catalytic reduction (hereafter it may also be referred to as SCR) catalyst has also been proposed, as a $NO_x$ purification catalyst. As for the SCR catalyst, several types of reducing agents to be used for purification of $NO_x$ have been known, and in the SCR, where the $NH_3$ component is used as a reducing agent, $NO_x$ is finally reduced to $N_2$ mainly by the following reaction formulas (1) to (3):

$$4NO+4NH_3+O_2 \rightarrow 4N_2+6H_2O \quad (1)$$

$$6NO_2+8NH_3+O_2 \rightarrow 7N_2+12H_2O \quad (2)$$

$$NO+NO_2+2NH_3 \rightarrow 2N_2+3H_2O \quad (3)$$

In a denitration catalyst system utilizing such a reaction mechanism, a gasified $NH_3$ may be used as the reducing component, however, $NH_3$ itself has irritating odor or hazardous property. Therefore, there has been proposed a system for adding urea water, as the $NH_3$ component, from the upstream of the denitration catalyst, generating $NH_3$ by pyrolysis or hydrolysis, and having this acted as a reducing agent to exert denitration performance by the above reaction formulas.

Reaction formulas for obtaining $NH_3$ by decomposition of urea in this way are as follows:

$$NH_3\text{—}CO\text{—}NH_2 \rightarrow NH_3+HCNO \text{(pyrolysis of urea)}$$

$$HCNO+H_2O \rightarrow NH_3+CO_2 \text{(hydrolysis of isocyanic acid)}$$

$$NH_2\text{—}CO\text{—}NH_2+H_2O \rightarrow 2NH_3+CO_2 \text{(hydrolysis of urea)}$$

In purification of $NO_x$ in exhaust gas, it is ideal that $NH_3$ supplied is all consumed in the above denitration reactions (1) to (3). However, in $NO_x$ purification in a vehicle loaded with a diesel engine, where transient operation condition is predicted under practical running condition, it is also predicted to use $NH_3$, which was intentionally made adsorbed on the SCR catalyst surface by supplying an surplus reducing agent than that consumed in the reaction, so as to be able to effectively purify $NO_x$ under any running condition. In this way, when exhaust gas temperature is raised rapidly by rapid acceleration in a state that $NH_3$ is adsorbed on the SCR catalyst or the like, $NH_3$ eliminated does not contribute to the $NO_x$ purification reaction, and leaks to the downstream of the SCR catalyst (hereafter it may be referred to as slip, or $NH_3$ slip), where a risk of incurring secondary pollution, such as new environmental contamination, has been pointed out.

As a countermeasure against such a problem, it is also considered to increase capacity of the SCR to a degree not requiring $NO_x$ purification using $NH_3$ adsorbed, however, because of limitation in loading capacity or arrangement of the catalyst in an automotive application, such countermeasures cannot be said a practical solution that simply increases catalyst capacity of the SCR.

Other than this, various catalyst technologies have been investigated, as a treatment system after the addition of other catalysts, without using only the SCR catalyst (for example, refer to PATENT DOCUMENT 1 and PATENT DOCUMENT 4). In addition, there has also been investigated a purification method for slipped $NH_3$ by oxidation as in the following reaction formula (4), by installing a $NH_3$ purification catalyst, where platinum (Pt), palladium (Pd), rhodium (Ph) or the like is supported on a base material such as alumina, at the latter part of the SCR, to purify $NH_3$ slipped from the SCR.

$$2NH_3 + 3/2O_2 \rightarrow N_2 + 3H_2O \tag{4}$$

However, because the above, catalyst for purifying $NH_3$ uses a noble metal component such as platinum, palladium, or rhodium, having high oxidation performance, as a catalyst active species, there was a problem of incurring new generation of $NO_x$ components such as $N_2O$, NO, and $NO_2$ at the same time of oxidation of $NH_3$, as shown in the following reaction formulas (5) to (7).

$$2NH_3 + 5/2O_2 \rightarrow 2NO + 3H_2O \tag{5}$$

$$2NH_3 + 7/2O_2 \rightarrow 2NO_2 + 3H_2O \tag{6}$$

$$2NH_3 + 2O_2 \rightarrow N_2O + 3H_2O \tag{7}$$

To suppress generation of such $NO_x$, there has been proposed a purification catalyst arranged with a component having $NH_3$ oxidative decomposition activity at the lower layer, and arranged with a denitration component at the upper layer (refer to PATENT DOCUMENT 5) This is understood as a catalyst capable of not only purifying $NH_3$ by oxidation of $NH_3$ but also having a role of a $NO_x$ purification reaction by reacting $NO_x$ generated by $NH_3$ oxidation of the above reaction formulas (5) to (7), with slipped $NH_3$ not yet used in the oxidation reaction. There have also been proposed a catalyst for exhaust gas purification using one or more kind of oxides selected from titanium, tungsten, molybdenum or vanadium, as a denitration component of the upper layer refer to PATENT DOCUMENT 2); or a catalyst for ammonia oxidative decomposition catalyst using a mixed system of a Ce—Ti—SO$_4$—Zr-type component and a Fe—Si—Al oxide-type component at the upper layer (refer to PATENT DOCUMENT 3); and a purification catalyst using Fe-containing zeolite or Ce-containing zeolite at the upper layer (refer to PATENT DOCUMENT 6). Also in these catalysts having a role of $NH_3$ purification, a noble metal is used as a $NH_3$ oxidative component.

As described above, in a situation of an ever strengthening exhaust gas regulation year by year, ratio of loading an exhaust gas purification catalyst system on a vehicle has increased, and price of a noble metal has soared upwards under a situation of using a rare and expensive noble metal in a large quantity. On the other hand, a too expensive catalyst as the automotive exhaust gas purification catalyst is not practical, due to giving one factor of raising vehicle price, and thus purification technology using an inexpensive active component has been investigated, so that sufficient purification performance can be exerted by less usage of the noble metal.

There has been proposed, for example, in a catalyst system composed of a noble metal particles, a catalyst promoter component, and a substrate, formation of composite micro particles in a state that a noble metal salt and a metal salt exist at the same time, inside the micelle of the catalyst, using a reversed micelle method, so that contact area between the noble metal particles and the promoter component does not decrease by sintering, by which there has been described that promoter effect, which a metal compound has, becomes exerted, and a low cost catalyst having high catalytic activity and high heat resistance can be obtained (refer to PATENT DOCUMENT 7). In addition, there have been performed many investigations, for example, on exhaust gas catalysts using Au, as a substitution metal of a platinum group element in an automotive catalyst. There has been reported supporting of Au on a substrate consisting of a ceria-zirconia solid solution having a ceria content of 40 to 80% by weight, for example, as a exhaust gas purification catalyst consisting of an Au catalyst having high CO oxidation activity (refer to PATENT DOCUMENT 8).

Under such circumstance, there has been required a slipped $NH_3$ purification catalyst, having also suppressing function of generation of $N_2O$ or $NO_x$, which is capable of decreasing usage of the noble metal of the catalyst aiming at purification of slipped $NH_3$, in the SCR catalyst system using the above $NH_3$ as a reducing agent.

In particular such a catalyst has been earnestly desired that exerts high purification performance of $NH_3$ at lower temperature, because temperature of exhaust gas is lowered during passing through inside a piping, and temperature of a catalyst bed of a slipped $NH_3$ purification catalyst is lowered, due to use of the slipped $NH_3$ purification catalyst at the most end part of the exhaust gas purification apparatus.

CITATION LIST

Patent Literature

PATENT LITERATURE 1: JP-A-2004-524062
PATENT LITERATURE 2: JP-A-10-5591
PATENT LITERATURE 3: JP-A-2005-238195
PATENT LITERATURE 4: JP-A-2002-502927
PATENT LITERATURE 5: JP-A-07-328438
PATENT LITERATURE 6: JP-A-2008-279334
PATENT LITERATURE 7: JP-A-2005-185969
PATENT LITERATURE 8: JP-A-2008-296107

SUMMARY OF INVENTION

Technical Problem

In view of the above conventional problems, it is an object of the present invention to provide the ammonia oxidation catalyst, which is capable of oxidizing and purifying ammonia slipped from the selective catalytic reduction, while effectively suppressing by-production of $N_2O$ or $NO_x$, superior in heat resistance, has small pressure drop and is capable of reducing usage of a noble metal, even under high space velocity (SV), in purifying nitrogen oxides (NO or $NO_2$) discharged from a lean-burn engine such as a boiler, a gas turbine, a lean burn-type gasoline engine, or a diesel engine, by spray supplying urea water or ammonia water, as a reducing component, onto a selective catalytic reduction; and the exhaust gas purification apparatus and the exhaust gas purification method using the same.

Solution to Problem

The present inventors have intensively studied a way to solve the above-described problems and as a result, discovered that by arranging a catalyst coated with at least two catalyst layers having a catalyst layer (lower layer) including a catalyst supported a noble metal element on an inorganic base material including any of a composite oxide (A) having at least titania and silica as main components, alumina, and a composite oxide (B) consisting of alumina and silica; and a catalyst layer (upper layer) including a composite oxide (C) consisting of at least silica, tungsten oxide, ceria and zirconia, at the surface of an integral structure-type substrate, at the latter part of the selective catalytic reduction, in purifying the $NO_x$ components using the selective catalytic reduction catalyst and using the $NH_3$ component as the reducing agent, oxidizing and purifying slipped $NH_3$ from the selective catalytic reduction becomes possible in an equivalent level as in the case of high supported amount of the noble metal, even in the case of low supported amount of the noble metal, and have thus completed the present invention.

That is, according to a first aspect of the present invention, there is provided an ammonia oxidation catalyst (AMOX) for oxidizing and removing surplus ammonia, in selectively reducing nitrogen oxides by adding urea or ammonia as a reducing agent of the nitrogen oxides and using a selective catalytic reduction (SCR) catalyst, into exhaust gas discharged from a lean-burn engine, comprising by coating at least two catalyst layers having a catalyst layer (lower layer) comprising a catalyst supported a noble metal element on an inorganic base material comprising any of a composite oxide (A) having at least titania and silica as main components, alumina, and a composite oxide (B) consisting of alumina and silica, and a catalyst layer (upper layer) comprising a composite oxide (C) consisting of at least silica, tungsten oxide, ceria, and zirconia, at the surface of an integral structure-type substrate, characterized in that a composition of the composite oxide (C) is silica: 20% by weight or less, tungsten oxide: 1 to 50% by weight, ceria: 1 to 60% by weight, and zirconia: 30 to 90% by weight.

In addition, according to a second aspect of the present invention, there is provided the ammonia oxidation catalyst, in the first aspect, characterized in that the composition of the composite oxide (A) is titania: 60 to 99% by weight and silica: 1 to 40% by weight.

In addition, according to a third aspect of the present invention, there is provided the ammonia oxidation catalyst, in the first or the second aspect, characterized in that the composite oxide (A) further includes zirconia or alumina, wherein the content thereof is 30% by weight or less.

In addition, according to a fourth aspect of the present invention, there is provided the ammonia oxidation catalyst, in the first aspect, characterized in that composition of the composite oxide (B) is alumina: 70 to 99.9% by weight and silica: 0.1 to 30% by weight.

In addition, according to a fifth aspect of the present invention, there is provided the ammonia oxidation catalyst, in the first aspect, characterized in that composition of the composite oxide (C) is silica: 0.1 to 5% by weight, tungsten oxide: 3 to 30% by weight, ceria: 5 to 40% by weight, and zirconia: 50 to 90% by weight.

In addition, according to a sixth aspect of the present invention, there is provided the ammonia oxidation catalyst, in the first aspect, characterized in that the catalyst layer (lower layer) further includes the composite oxide (C) or zeolite (D).

In addition, according to a seventh aspect of the present invention, there is provided the ammonia oxidation catalyst, in the first aspect, characterized in that the catalyst layer (upper layer) further includes zeolite (D).

In addition, according to an eighth aspect of the present invention, there is provided the ammonia oxidation catalyst, in the first aspect, characterized in that the noble metal element to be supported is platinum.

Still more, according to a ninth aspect of the present invention there is provided the ammonia oxidation catalyst, in the sixth or seventh aspect, characterized in that zeolite (D) includes at least iron and content thereof is 0.1 to 5% by weight in $Fe_2O_3$ equivalent.

In addition, according to a tenth aspect of the present invention, there is provided the ammonia oxidation catalyst, in the first aspect, characterized in that content of the noble metal element, to be supported on an inorganic base material comprising any of the composite oxide (A), alumina, and the composite oxide (B), is 0.01 to 1.0 g/L.

In addition, according to an eleventh aspect of the present invention, there is provided the ammonia oxidation catalyst, in the first aspect, characterized in that coated amount of the inorganic base material, including any of the composite oxide (A), alumina and the composite oxide, (B) of the catalyst layer (lower layer), is 10 to 60 g/L, per unit volume of the integral structure-type substrate.

In addition, according to a twelfth aspect of the present invention, there is provided the ammonia oxidation catalyst, in the first aspect, characterized in that coated amount of the composite oxide (C) of the catalyst layer (upper layer), is 10 to 150 g/L, per unit volume of the integral structure-type substrate.

In addition, according to a thirteenth aspect of the present invention, there is provided the ammonia oxidation catalyst, in the sixth aspect, characterized in that coated amount of the composite oxide (C) or zeolite (D) of the catalyst layer (lower layer) is 120 g/L or less, per unit volume of the integral structure-type substrate.

In addition, according to a fourteenth aspect of the present invention, there is provided the ammonia oxidation catalyst, in the seventh aspect, characterized in that coated amount of zeolite (D) of the catalyst layer (upper layer) is 150 g/L less, per unit volume of the integral structure-type substrate.

In addition, according to a fifteenth aspect of the present invention, there is provided an exhaust gas purification apparatus, characterized in that an oxidation catalyst (DOC) having oxidation function of nitrogen monoxide and hydrocarbons, a filter (DPF) for removing particulate matters by trapping and combusting them, a spraying means for supplying a urea aqueous solution or an ammonia aqueous solution, the selective catalytic reduction (SCR) catalyst, and the ammonia oxidation catalyst (AMOX), in any of the first to the fourteenth aspects, are arranged in this order in an exhaust gas passage.

Still more, according to a sixteenth aspect of the present invention, there is provided the exhaust gas purification apparatus, in the fifteenth aspect, characterized in that the selective catalytic reduction (SCR) catalyst is made by coating a catalyst layer including zeolite (D) including at least an iron element, and the composite oxide substantially consisting of silica, tungsten oxide, ceria and zirconia (C), on the surface of the integral structure-type substrate.

On the other hand, according to a seventeenth aspect of the present invention, there is provided an exhaust gas purification method, characterized by passing the exhaust gas discharged from a lean-burn engine through the oxidation catalyst (DOC) and the filter (DPF), purifying hydrocarbon components and carbon monoxide in exhaust gas, as well as converting many of nitrogen monoxide to nitrogen dioxide, thereafter by spray supplying the urea aqueous solution or the ammonia aqueous solution and by passing through the selective catalytic reduction (SCR) catalyst to reduce nitrogen oxides in the exhaust gas, and further by passing through ammonia oxidation catalyst (AMOX) to oxidize and remove surplus ammonia, using the exhaust gas purification apparatus in the fifteenth or sixteenth aspect.

Advantageous Effects of Invention

According to the ammonia oxidation catalyst of the present invention, in the case of treatment of a $NH_3$ component, as a reducing agent, in a wide temperature range of from low temperature to high temperature, for example, from 130 to 560° C., as for $NO_x$ in exhaust gas discharged from various kinds of lean-burn engines, it is possible to purify slipped $NH_3$, in high efficiency, and suppress by-production of $N_2O$ or generation of new $NO_x$ accompanied with oxidation of the $NH_3$, even in less supported amount of the noble metal, as compared with conventional technology. In addition, because a harmful heavy metal such as vanadium is not included, as a catalyst component, safety thereof is high. Still more, it can response to request for making lower fuel cost and higher output, due to capability of reducing pressure drop.

DESCRIPTION OF EMBODIMENTS

Figure 1:
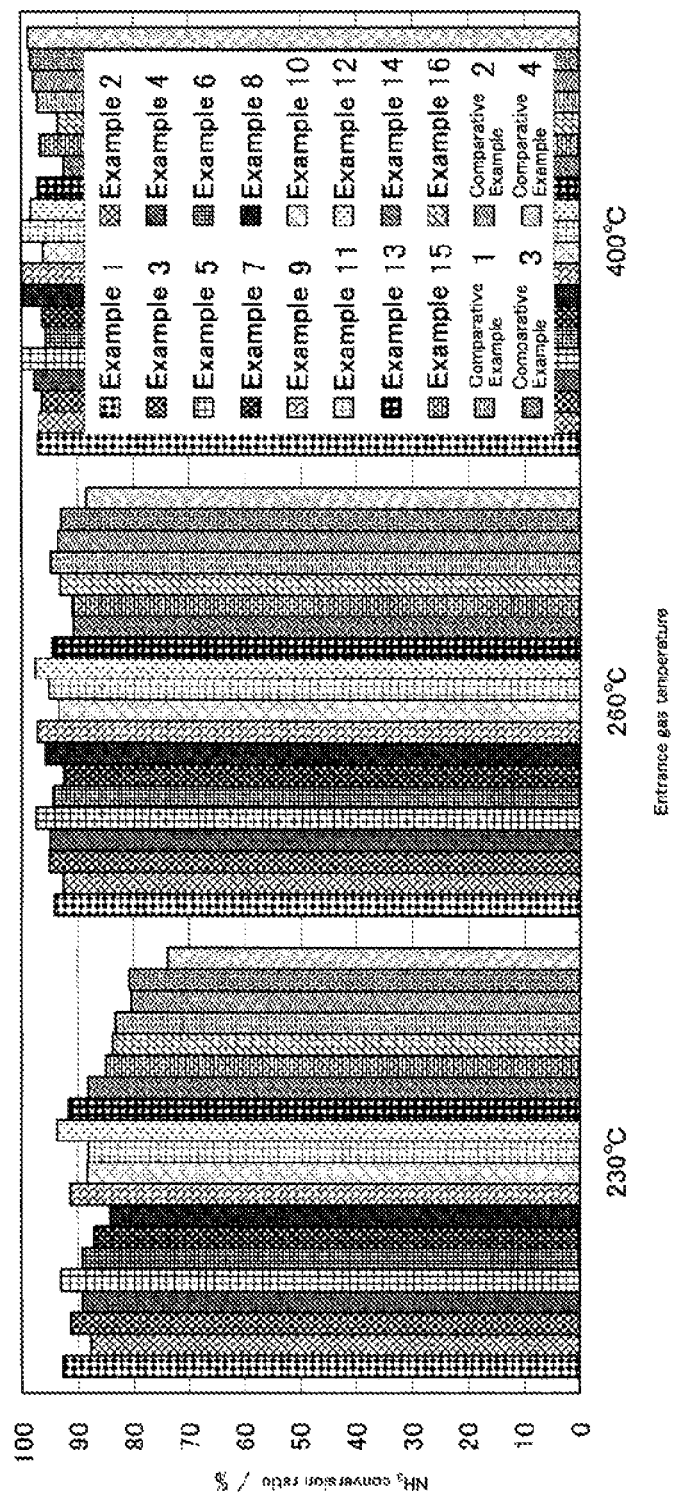
FIG. 1 is a graph representing ammonia conversion, in the case of using the ammonia oxidation catalyst of the present invention (Example) or a conventional ammonia oxidation catalyst (Comparative Example).

Explanation will be given below in detail on the ammonia oxidation catalyst of the present invention, and the exhaust gas purification apparatus and the exhaust gas purification method using the same, using mainly a diesel engine used in an automobile, as an example.

1. The Ammonia Oxidation Catalyst (AMOX)

The ammonia oxidation catalyst of the present invention (hereafter it may also be referred to as the present catalyst) is characterized by coating at least two catalyst layers having a catalyst layer (lower layer) including a catalyst supported a noble metal element on an inorganic base material including any of a composite oxide (A) having at least titania and silica as main components, alumina, and a composite oxide (B) consisting of alumina and silica; and a catalyst layer upper layer) including a composite oxide (C) consisting of at least silica, tungsten oxide, ceria, and zirconia, at the surface of an integral structure-type substrate, wherein a composition of the composite oxide (C) is silica: 20% by weight or less, tungsten oxide: 1 to 50% by weight, ceria: 1 to 60% by weight, and zirconia: 30 to 90% by weight, in the ammonia oxidation catalyst (AMOX) for oxidizing and removing surplus ammonia, in selectively reducing nitrogen oxides using a selective catalytic reduction (SCR) catalyst, by adding urea or ammonia as a reducing agent of the nitrogen oxides, into exhaust gas discharged from a lean-burn engine.

(1) A Lower Catalyst Layer

In the ammonia oxidation catalyst of the present invention, the lower catalyst layer includes a catalyst supported a noble metal element on the inorganic base material including any of the composite oxide (A) having at least titania and silica as main components, alumina, and the composite oxide (B) consisting of alumina and silica, and has ammonia oxidation function.

(1-1) The Noble Metal Component

In the present invention, the noble metal component is one or more kind of element selected from platinum, palladium, or rhodium. Among these, platinum has high oxidation activity and exerts superior $NH_3$ oxidation performance, therefore, it is desirable to be contained in the lower catalyst layer, as a major noble metal component. Here the major noble metal component means a component to be contained in an amount of 50% by weight or more, relative to total amount of the noble metals to be used in the catalyst of the present invention, and all of the noble metals may be platinum.

In this case, in the case where the lower catalyst layer component of the present invention is coated on an integral structure-type substrate, usage of the noble metal is preferably 0.01 to 1.0 g/L and more preferably 0.02 to 0.5 g/L, per unit volume of the integral structure-type substrate. The amount below 0.01 g/L makes impossible to sufficiently utilize activity of the noble metal, while even the case of the amount over 1.0 g/L, comparative effect thereof cannot be expected.

The catalyst component forming the lower catalyst layer exerts superior oxidation performance, in particular, when the noble metal is Pt or Pd. As described above, Pt is a catalytic active species with superior oxidation property, therefore by maintaining specific surface area thereof high, activated surface is increased and high activity can be exerted.

Accordingly, in the present invention, it is preferable that the noble metal is supported on an inorganic base material including the composite oxide (A) having titania and silica as main components, and added with zirconia and alumina, as needed, alumina, and a composite oxide (B) consisting of alumina and silica. In this way, the noble metal can be supported in a highly dispersed state, as well as the noble metal component becomes difficult to be sintered, due to having high heat resistance, and thus a highly dispersed state of the noble metal can be maintained for a long period of time during use.

(1-2) The Composite Oxide (A)

The composite oxide (A) is an inorganic base material having titanic and silica as main component, having high specific surface area and is also superior in heat resistance, and is capable of supporting the noble metal component such as platinum, in a highly dispersed state.

Composition of the composite oxide (A) is preferably titania: 60 to 99% by weight, and silica: 1 to 40% by weight. The composite oxide (A) still more includes at least one or more kind selected from zirconia and alumina, and it is more preferable that at least one of zirconia and alumina occupied in the composite oxide (A) is 0 to 30% by weight.

That is, in the present invention, titanic and silica are essential as the composite oxide (A), and a composite oxide including at least one of zirconia or alumina, for example, an inorganic oxide, such as titanic-silica, titania-silica-zirconia, titanic-silica-alumina, or titania-silica-zirconia-alumina can be used in an amount of 30% by weight or less.

Such an inorganic oxide an inorganic base material), in view of dispersibility of the noble metal component, preferably has a specific surface area (by the BET method, the same hereinafter) of 30 $m^2/g$ or higher, and still more preferably 100 $m^2/g$ or higher. The specific surface area of 30 $m^2/g$ or higher is capable of stably supporting the noble metal in a highly dispersed state.

(1-3) Alumina

Alumina has high BET specific surface area and is also superior in heat resistance, excluding α-alumina, therefore is very useful as a base material for making supported a noble metal component such as platinum, in a highly dispersed state.

Still more, alumina is present in many forms such as, other than the one having a hydroxyl group (—OH group) at the end, the one where $O^-$ is exposed, the one where $O^+$ is formed by coordination of $H_2O$, and the one where $Al^+$ is formed by coordinative unsaturation of Al. Because they have specifically high electric charge (+−) respectively, they tend to function as active sites of the catalyst. Among them, an active site of the surface having the positive (+) electric charge is generally called an "acid site", and $NH_3$ adsorbs to the hydrogen of the hydroxyl group (−OH group).

As kind of alumina, any of γ-alumina, δ-alumina, θ-alumina, or boehmite is preferable, excluding α-alumina having low BET specific surface area.

(1-4) The Composite Oxide (B)

In the present invention, as described above, alumina may be present alone, however, acidity itself is weak, although it adsorbs $NH_3$. On the other hand, silica alone is capable of adsorbing $NH_3$ only physically. However, the composite oxide (B) where silica is added to alumina, strongly adsorbs $NH_3$, as well as has many acid sites, therefore, is capable of promoting oxidation activity of $NH_3$ by a noble metal.

Accordingly, in the present invention, it is preferable to use by supporting the noble metal component such as platinum on the composite oxide (B) consisting of alumina and silica, which has high BET specific surface area and is also superior in heat resistance. Composition of the composite oxide (B) is not especially limited, however, it is preferable that alumina is 70 to 99.9% by weight, and silica is 0.1 to 30% by weight, and more preferably alumina is 75 to 99% by weight, and silica is 1 to 25% by weight.

Supporting the noble metal on the above inorganic, base material can be performed by a known method, as appropriate, by mixing hexachloroplatinic (IV) acid, diammineplatinum(II) nitrite, an ethanolamine solution of hexahydroxoplatinic (IV) acid, an aqueous solution of a metal salt such as hexachloroplatinic (IV) acid, platinum nitrate, dinitrodiammine palladium, palladium nitrate, palladium chloride, rhodium (III) chloride, or rhodium(III) nitrate, and the inorganic base material, drying and calcining or the like.

Content of the inorganic base material including any of the composite oxide (A), alumina, or the composite oxide (B), in the lower catalyst layer is desirably 10 to 60 g/L, and in particular, 15 to 50 g/L, per unit volume of the integral structure-type substrate. The reason for that is the too high content of the inorganic base material including any of the composite oxide (A), alumina, or the composite oxide (B) increases the useless inorganic base material not contributing enhancement of dispersibility of the noble metal, while on a contrary, the too low content cannot promote $NH_3$ oxidation, resulting in generation of slipped $NH_3$ in some cases.

In addition, the lower layer to be coated on the integral structure-type substrate of the present invention may have a material having $NO_x$ purification function, other than the composite oxide (A), alumina, and the composite oxide (B), which are the above inorganic base material. A material having $NO_x$ purification function includes a transition metal oxide such as titania, zirconia, tungsten oxide, or ceria, a rare earth oxide of such as lanthanum oxide, praseodymium oxide, samarium oxide, gadolinium oxide, or neodymium oxide; a base metal oxide such as gallium oxide, tin oxide, or the like, or a composite oxide thereof, other than a composite oxide (C) and zeolite (D) ion exchanged with iron as a transition metal, to be described later.

(1-4) The Composite Oxide (C)

In the present invention, the composite oxide (C) is a composite oxide consisting of at least silica, tungsten oxide, ceria, and zirconia, and this composite oxide (C) is an arbitrary component at the lower layer. Here, tungsten oxide shall include the one existing as a simple substance of a tungsten element, other than tungsten oxide.

Coated amount of the composite oxide (C) is 120 g/L or less, and more preferably 100 or less, per unit volume of the integral structure-type substrate.

By presence of the composite oxide (C) at the lower layer, a reaction between $NH_3$ and $NO_x$ is promoted, and SCR function is increased. In addition, by inclusion of tungsten oxide or zirconia, $NH_3$ adsorption capacity increases, therefore, slip of $NH_3$, which was not able to contact with the noble metal at the lower catalyst layer, is suppressed. On the contrary, the amount more than 120 g/L increases relative amount as compared with the Pt-supported composite oxide (A) composing the lower layer, therefore, may deteriorate gas diffusion to Pt, in some cases.

In the present invention, zeolite (D) includes, for example, beginning with a β-type zeolite and an MFI-type zeolite having a 3D micropore structure, zeolite such as A, X, Y, MOR, CHA, or SAPO, however, this zeolite (D) is an arbitrary component in the lower layer. Among zeolite (D), the preferable one is the β-type zeolite or the MFI-type zeolite.

Content of zeolite (D) in the lower layer is 120 g/L or less, and preferably 100 g/L or less. By presence of zeolite (D), a reaction between $NH_3$ and $NO_x$ is promoted, as well as $NH_3$ adsorption capacity becomes increased, by which $NH_3$ contacting with the noble metal is increased, and $NH_3$ oxidation is promoted, however, the amount over 120 g/L increases relative amount as compared with the Pt-supported composite oxide (A) composing the lower layer, therefore, may deteriorate gas diffusion to Pt, in some cases.

In addition, in this lower layer, a material having purification function of $NO_x$ to be described later may be included other than a material having ammonia oxidation function.

(2) An Upper Catalyst Layer

In the present invention, the upper catalyst layer is composed of the composite oxide (C) consisting of at least silica, tungsten oxide, ceria, and zirconia, as essential components, without including the noble metal component. The tungsten oxide in the composite oxide (C) shall include the one present as a simple substance of tungsten element, other than an oxide of tungsten.

(2-1) The Composite Oxide (C)

In the present catalyst, the composite (C) is composed of silica: 20% by weight or less, tungsten oxide: 1 to 50% by weight, ceria: 1 to 60% by weight, and zirconia: 30 to 90% by weight, and is more preferably set so as to attain a composition of silica: 0.1 to 5% by weight, tungsten oxide: 3 to 30% by weight, ceria: 5 to 40% by weight, and zirconia: 50 to 90% by weight.

As for function of each component in the composite oxide (C), for example, it is considered as follows.

Silica has been known to have the high BET specific surface area as compared with various kinds of metal oxides, and by increasing the BET specific surface area in the composite oxide system composed of silica and other elements, number of active sites can be increased. Still more, silica takes a porous structure having many meso-porous holes with a diameter of 2 to 10 nm, and by trapping $H_2O$ generated by an oxidation reaction $NH_3$, of or a $NO_x$—$NH_3$ reaction, into the holes, reaction equilibrium of the oxidation reaction of $NH_3$, or the $NO_x$—$NH_3$ reaction or the like is shifted to a reaction product side, and thus these reactions are promoted.

In addition, ceria has been known as $NO_x$ adsorption function material, and also in the present material system, has function which is capable of promoting the SCP reaction between $NH_3$ and $NO_x$, by promoting adsorption of $NO_x$, and Zirconia functions as a dispersion holding material to disperse highly other components in a thermally stable state.

On the other hand, the oxide of tungsten has strong acidic property and high adsorption power of urea or ammonia, which is an alkaline component, therefore by using the oxide of tungsten, denitration performance is enhanced.

In the present catalyst, a role of tungsten (W), which may exist, among others, as a tungsten oxide or also as a simple substance of a tungsten element, is important and it is preferable that interface between cerium (Ce) and W is made to have a structure for promoting a DeNOx reaction. It is because of the fact that, in evaluation of model gas purification performance of ammonia-SCR using four kinds of material powder of a W/Ce material excluding Si and Zr, a W/Zr material excluding Si and Ce, and a W/Ce/Zr material excluding Si, in a Si/W/Ce/Zr material composing the composite oxide (C), as powder it is, without converting to a catalyst, $NO_x$ purification performance of the W/Ce material becomes higher than the W/Zr material, in comparison between the W/Ce material and the W/Zr material.

This composite oxide (C) is not especially limited, as for a preparation thereof, as long as it has the above composition and structure. It may include, for example, a method for calcining a solid substance obtained by dissolving a starting raw material having a form of a nitrate, a sulfate, a carbonate, an acetate, a chloride or the like, including silicon, tungsten, cerium or zirconium, at one time into an aqueous solution, then mixing and precipitating as a precipitate, by pH adjustment or the like, or by evaporation to dryness; or a method for performing the above treatment towards a single or multiple metal salts to form an oxide, and then supporting residual metal salts all at once or sequentially.

By either producing by adding all elements at the same time, or producing powder to be a core firstly from a single or several kinds of elements, and then supporting residual elements all at once or sequentially, the composite oxide (C), containing each element in an optimum composition, can be prepared.

Coated amount of the composite oxide (C) is preferably 10 to 150 g/L and more preferably 15 to 120 g/L, per unit volume of the integral structure-type substrate. The amount less than 10 g/L decreases a reaction between $NH_3$ and $NO_x$, provides insufficient SCR function, or because $NH_3$ adsorption capacity becomes small, $NH_3$, which was not able to contact with Pt at the lower catalyst layer may slip, in some cases. On the contrary, the amount more than 150 g/L increases load to an engine caused by increase in pressure drop, and thus it is not preferable.

(2-2) Zeolite (D)

The upper catalyst layer can include zeolite (D) as an arbitrary component, other than the composite oxide (C)

In the present invention, zeolite (D) includes, for example, beginning with a β-type zeolite and an MFI-type zeolite having a 3D micropore structure, zeolite such as A, X, Y, MOR, CHA, or SAPO. Among them, the preferable one is the β-type zeolite or the MFI-type zeolite.

The β-type zeolite to be used preferably in the present invention has, for example, a unit cell composition represented by the following average composition formula, and is classified as synthetic zeolite of a tetragonal system:

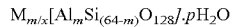

$$M_{m/x}[Al_m Si_{(64-m)}O_{128}] \cdot pH_2O$$

(wherein M represents a cation species; X represents valence of the above M; m represents a number of over 0 and below 64; and p represents a number of 0 or larger).

This β-type zeolite has a relatively complex 3D micropore structure consisting of linear micropores having relatively large diameter, aligned in one direction, and a curved micropores crossing with them, and provides easy diffusion of a cation in ion exchange and diffusion of a gas molecule such as $NH_3$. In addition, such a structure is a unique structure different from that of mordenite faulasite or the like, which has only linear vacancies aligned in one direction, and because of this complicated vacancy structure, β-type zeolite is difficult to arise structural collapse caused by heat and has high stability, and thus it is an effective material for an automotive catalyst.

In general, zeolite is necessary to have an acid site which is capable of adsorbing a basic compound such as $NH_3$, however, number of the acid site differs depending on Si/Al ratio thereof. Generally, zeolite having low Si/Al ratio has more number of the acid site, and has larger degree of degradation in durability under coexistence with steam, on the contrary, zeolite having high Si/Al ratio is superior in heat resistance. In the present catalyst, because $NH_3$ adsorbs at the acid site of zeolite, which becomes an active site to reduce and remove nitrogen oxides such as $NO_2$, the one having more acid sites (the one having lower Si/Al ratio) is advantageous in view of the denitration reaction. As an index corresponding to the Si/Al ratio, molar ratio (hereafter abbreviated as SAR) of $SiO_2$ and $Al_2O_3$, obtained by composition analysis, is generally used. As described above, as for SAR, durability and activity are in a trade off relation, and in consideration of this, SAP, of zeolite is preferably 15 to 300, and more preferably 17 to 60. Both the β-type zeolite and the MFI-type zeolite similarly have such characteristics.

It is preferable that zeolite including an iron element is contained, as a main component, in zeolite (D) of the present catalyst. Usually, in zeolite, as a solid acid site, a cation is present as a counter ion. As the cation, an ammonium ion or a proton is general, however, in the p-type zeolite to be used in the present catalyst, an iron element is added as the cation species, and it may be referred to as "Fe-β" in the present invention in some cases.

Reason for enhancement of action of the present invention by the β-type zeolite ion exchanged with an iron element is not certain, however, it is considered that, at the surface of zeolite, NO is oxidized to $NO_2$, to enhance reaction activity with $NH_3$, and a skeleton structure of zeolite is stabilized, and thus it contributes to enhancement of heat resistance.

The addition amount of Fe relative to zeolite is preferably 0.1 to 5% by weight, and more preferably 0.5 to 4.5% by weight in $Fe_2O_3$ equivalent. The amount of iron element over 5% by weight in $Fe_2O_3$ equivalent becomes not capable of securing number of the active solid, acid site, and decreases activity. The amount of iron element below 0.1% by weight in $Fe_2O_3$ equivalent does not provide sufficient $NO_x$ purification performance, and decreases purification performance of exhaust gas, and thus it is not preferable. It should be noted that as for the iron element added as an ion exchange species, all of them may be on exchanged, or a part of them may be present in a state of an iron oxide.

That is, a method for supporting the iron element (hereafter it may also be referred to as a metal catalyst component) may be a method by ion exchange or impregnation. In the present invention, it is desirable that at least a part of zeolite is ion exchanged with the metal catalyst component. By suitable ion exchange, a skeleton structure of zeolite is stabilized and heat resistance of zeolite itself is enhanced. It should be noted that the metal catalyst component may not be ion exchanged completely, and a part of them may be present in a state of an oxide.

A supporting method for the iron element on zeolite is not especially limited. Such zeolite added with the iron element can be purchased from major zeolite makers as various grades, and in addition, it can be produced by a procedure, described in JP-A-2005-502451 or the like. As a general supporting method, there may be included, other than an ion exchange method, an impregnation method by adding zeolite, into an aqueous solution of a nitrate, an acetate, a chloride or the like, including an iron element; a method for drying and calcining a precipitate, obtained by pH adjustment with an alkali or the like; or a method for evaporation to dryness, after immersing zeolite into the aqueous solution of a nitrate, an acetate, a chloride or the like, including the above iron element. Calcining temperature is preferably 300 to 800° C., and more preferably 400 to 600° C. Heating can be performed using a known heating means such as an electric furnace, or a gas furnace.

As zeolite having a 3D micropore structure, which is preferable as zeolite in the present invention, for example, an MFI-type zeolite has also been known, as the SCR component. Here, also Si/Al ratio of the MEI-type zeolite is similar as in the above β-type zeolite. The MEI-type zeolite preferably includes an iron element similarly as in the β-type zeolite. Among them, the MEI-type zeolite including an iron element may be referred to as "Fe-MFI" in some cases.

In addition, as zeolite species, in addition to the above zeolite, one or more kind of various types of zeolite such as A, X, Y, MOR, CHA, or SAPO may be used in combination.

In the case of using the present catalyst with other type of zeolite in combination, it is preferable that total ratio of the above various types of the β-type zeolite or the MFI-type zeolite is 50 to 100% in the all zeolite.

In addition, zeolite may include other transition metals, rare earth metals, or noble metals or the like, other than the above iron element. Specifically, there are included transition metals such as nickel, cobalt, zirconium, and copper; and rare earth metals such as cerium, lanthanum, praseodymium, and neodymium.

In addition, it is possible to add, as appropriate, a material generally usable as a catalyst material such as a noble metal such as gold, silver, platinum, palladium, rhodium, iridium, or ruthenium; niobium, tungsten, tantalum, ceria, a cerium-zirconium composite oxide, a lanthanum oxide, alumina, silica, zirconia, vanadia, tin, gallium; an alkali element, an alkaline earth element, or the like, within a range not to impair the object of the present invention.

In the present invention, as for zeolite (D), it is preferable that zeolite including Fe element is included in an amount of 50 to 100% by weight, and more preferably 60 to 100% by weight, relative to total amount of zeolite. Zeolite not including the iron element also has low activity as the SCR, therefore, increase in amount of such zeolite is not desirable.

Content of zeolite (D) is 150 g/L or less, and more preferably 120 g/L or less. By presence of zeolite, the reaction between $NH_3$ and $NO_x$ is promoted, as well as $NH_3$ adsorption capacity becomes increased, by which $NH_3$ contacting with a noble metal such as platinum is increased, and $NH_3$ oxidation is promoted, however, the amount over 150 g/L increases load to an engine caused by increase in pressure drop, and thus it is not preferable.

(3) The Integral Structure-Type Substrate

The integral structure-type substrate in the present invention is not especially limited, by kind thereof. Such one can be used, beginning with a honeycomb structure-type substrate, as a sheet-like structural body knitted with a fine fiber-like substance, a felt-like incombustible structural body consisting of a relatively thick fiber-like substance. Among these, the honeycomb structure-type substrate is preferable, and the one coated with a catalyst component at the surface of such a honeycomb structure-type substrate may hereafter be referred to as a honeycomb structure-type catalyst, in some cases.

Kind of the honeycomb structure-type substrate is not especially limited, and it is selectable from known honeycomb structure-type substrates. Among these, there is included a flow-through-type substrate, a wall-flow-type substrate used in DPF or CSF, however, in the present invention, the flow-through-type substrate is preferable, because the present catalyst is used at the latter part of the selective catalytic reduction (SCR) aiming at only purifying slipped $NH_3$.

In addition, whole shape of such a honeycomb structured body is arbitrary, and is selectable, as appropriate, from a column-type, a square prism-type, a hexagonal prism-type or the like depending on a structure of a discharge system to be applied. Still more, proper pore number of an opening part is also determined in consideration of kind of exhaust gas to be treated, gas flow rate, pressure drop, removal efficiency or the like, however, usually it is preferable to be about 10 to 1500 pieces, in particular, 100 to 900 pieces, per 1 square inch, for purification of exhaust gas of a diesel automobile. The cell density of 10 pieces or more, per 1 square inch, is capable of securing contact area between exhaust gas and the catalyst, and providing sufficient exhaust gas purification function, while the cell density of 1500 pieces or less, per 1 square inch, never impairs performance of an internal combustion engine, due to no generation of significant pressure drop of exhaust gas.

In addition, as for the lower catalyst layer, in the case of using the catalyst component of the present invention by coating on a permeable structured substrate such as ceramics, the component of the lower layer permeates the structured substrate, and all of or a part of the lower layer may be integrated with the structured substrate. In addition, the structured substrate may be composed of the component of the lower layer, and the component of the upper layer may be coated thereon. It should be noted that there may be the case where a bottom layer is set up between the lower layer and the structured substrate aiming at enhancing adhesion property of the catalyst layer, however, in this case, relation between the bottom layer and the lower layer is the same as relation between the above structured substrate and the lower layer.

In addition, it is preferable that such a honeycomb structure-type substrate has a cell wall thickness of 2 to 12 mil (milli-inch) and more preferably 4 to 8 mil. In addition, a material of the honeycomb structure-type substrate includes a metal such as stainless steel, ceramics such as cordierite.

It should be noted that in the present invention, such one can also be used as a sheet-like structural body knitted with a fine fiber-like substance, a felt-like incombustible structural body consisting of a relatively thick fiber-like substance, however, the integral structure-type substrate different from these honeycomb structure-type substrates could increase backpressure, but may provide the case of increasing treatment capability as compared with other structure-type substrates, because of having more supported amount of the catalyst component, as well as larger contact area with exhaust gas.

In the case where components of the present catalyst are used by being coated on the above flow-through-type honeycomb substrate, the coated amount thereof is, in the upper layer, preferably 50% or more of that of the lower layer, and total coated amount of the upper layer and the lower layer is preferably 40 g/L or more, and more preferably 50 g/L or more, per unit volume, in the substrate having a hole number of the opening part of 200 to 900 pieces, per 1 square inch, and a cell wall thickness of 4 to 8 mill.

It should be noted that the upper limit of the coated amount is not especially limited, as production cost does not rise, honeycomb holes do not clog, or backpressure of exhaust gas does not significantly increase, however, it is desirable to be held to about 230 g/L or less, and more desirable to be held at about 170 g/L or less, in the above flow-through-type honeycomb substrate. Although it depends on cell density of the substrate to: be used in the case of using the honeycomb structured body having practical cell density, performance of a combustion engine may be inhibited by increase in backpressure in some cases, when the catalyst is supported in an amount over 230 g/L.

As materials composing the lower catalyst layer and the upper catalyst layer of the catalyst of present invention, other than the above materials, a solid acid, a binder or the like can also be used by mixing. As such a solid acid, there is included $WO_3/Zr$, $WO_3/Ti$, $SO_3/Zr$, metallosilicate or the like, and as the binder, it is preferable to use alumina, silica, titania, silica-alumina, zirconia, and sol, gel and a solution thereof or the like.

Thickness of each layer is not especially limited, and it is enough to be, for example, 1 to 430 μm, in particular, a range of 20 to 250 μm is preferable. It is desirable that thickness of the upper layer is 40 to 250 μm, and thickness of the lower layer is 1 to 180 μm. It is allowed that thickness of each layer may be uneven, however, it is preferable that average value is within the above range. The case where each layer is too thin provides an insufficient catalyst component, and makes difficult to exert function as a layer, while the case where thickness each layer is too thick decreases gas diffusibility and inhibits mass transfer, and thus it is not preferable.

2. A Preparation for the Ammonia Oxidation Catalyst

To prepare the catalyst of the present invention, firstly a lower catalyst layer material, an upper catalyst layer material and the integral structure-type substrate are prepared. The catalyst materials are produced by mixing additives such as a binder and a surfactant, as needed, with water or a solvent where a water-soluble organic solvent is added to water to make a slurry-like mixture, and after coating it on the integral structure-type substrate, by drying and calcining it. It should be noted that water or the solvent where a water-soluble organic solvent is added to water will be referred to as a "aqueous medium" hereafter.

That is, the slurry-like mixture is obtained by mixing the catalyst materials and the aqueous medium in the specified ratio. In the present invention, the aqueous medium may be used in an amount capable of dispersing each catalyst component uniformly in the slurry.

The lower catalyst layer material includes any of a noble metal catalyst component including at least platinum, and the composite oxide, (A) including at least titania and silica as main components, and the composite oxide (B) consisting of alumina or alumina and silica, as an inorganic base material. The noble metal catalyst component may be supported, in advance, on the inorganic base material. Slurry is prepared, in advance, by mixing the metal catalyst components and the inorganic base material in the aqueous medium.

In preparing the lower catalyst layer material, in the case of supporting the noble metal, in advance, on the inorganic base material, a known method can be adopted, as appropriate, and one example thereof will be shown as follows.

Firstly, as a raw material of the noble metal component, it is prepared as a compound such as a nitrate, a sulfate, a carbonate, or an acetate, specifically as hexachloroplatinic (IV) acid, diamminedinitroplatinum (II), an ethanolamine solution of hexahydroxoplatinic (IV) acid, tetrachloroplatinic (II) acid, platinum nitrate, diamminedinitropalladium palladium nitrate, palladium chloride, rhodium (III) chloride, or rhodium (III) nitrate. The raw material of the noble metal component is selected from these, and dissolved into water or an organic solvent.

Next, the solution of this raw material of the noble metal component is mixed with the inorganic base material together with the aqueous medium, and then dried at 50 to 200° C., to remove the solvent, and then calcined at 300 to 1200° C. It should be noted that, other than the above components, a known catalyst material may be blended as an oxygen storing and discharging material, a binder or the like. Such a known catalyst material includes a cerium-zirconium-type composite oxide, cerium oxide, titania, zirconia, alumina, silica, silica-alumina, an alkali metal material, an alkaline earth metal material, a transition metal material, a rare earth metal material, silver, a silver salt or the like, and a dispersing agent and a pH adjuster can be used, as needed, in combination.

Next, the catalyst composition is coated, as slurry-like mixture, on the integral structure-type substrate to cover the catalyst composition. The coating method is not especially limited, however, a washcoat method is preferable. After coating, by performing drying and calcining, the integral structure-type catalyst supported by the catalyst composition is obtained. It should be noted that drying temperature is preferably 100 to 300° C. and more preferably 100 to 200° C. In addition, calcining temperature is preferably 300 to 700° C. and particularly preferably 400 to 600° C. Drying time is preferably 0.5 to 2 hours, and calcining time is preferably to 1 to 3 hours. Heating can be performed using a known heating means such as an electric furnace, or a gas furnace.

The ammonia oxidation catalyst of the present invention is prepared after coating the lower catalyst layer material on the integral structure-type substrate, as described above, and then drying, calcining, and next by coating the upper catalyst layer material on this layer, drying and calcining. The upper catalyst layer material substantially includes the composite oxide (C) consisting of silica, tungsten oxide, ceria and zirconia and other than this, zeolite can be blended, as needed, as a raw material of the upper catalyst layer.

Other than this, such a method may be adopted that the lower catalyst layer material and the upper catalyst layer material are coated twice continuously by the washcoat method, and then drying and calcining at one time; or the lower catalyst layer material is coated by the washcoat method, then drying, coating materials of the second and the following layers thereon, they drying, and calcining at one time.

In the case of coating the catalyst composition on the honeycomb-type integral structure-type substrate, when shape of the honeycomb is polygon, thickness of the layer may become different depending on the portion of the honeycomb in some cases, however, it is preferable that the thickness is within a range of 1 to 250 μm, and in particular, within a range of 20 to 250 μm, at both the upper layer and the lower layer in substantially most of the portions.

When the upper layer is too thin and below 5 μm, previous gas diffusibility may decrease in some cases, and when the total layer is too thick and over 430 μm, load to an engine is worried caused by increase in pressure drop, in the case where the catalyst composition of the present invention is coated on the honeycomb-type integral structure-type substrate usually used. Particularly preferable thickness is 40 to 250 μm for the upper layer, and 1 to 100 μm for the lower layer.

3. The Exhaust Gas Purification Catalyst Apparatus and a Purification Method Using the Same In the present invention, the exhaust gas purification catalyst apparatus is composed by arranging the oxidation catalyst (DOC) having oxidation function of nitrogen monoxide and hydrocarbons, the filter (DPF) for removing particulate matters by trapping and combusting them, a spraying means for a urea aqueous solution or an ammonia aqueous solution, the SCR catalyst and the above ammonia oxidation catalyst (AMOX) in this order in an exhaust gas passage.

A diesel engine has relatively low exhaust gas temperature as compared with a gasoline engine, due to structural characteristics thereof, and the temperature is from about room temperature to 700° C. In particular, in startup or at low load, exhaust gas temperature is low. However, in the case where exhausted gas temperature is low, also catalyst temperature does not increase sufficiently, purification performance is not exerted sufficiently, and thus $NO_x$ in exhaust gas is not purified sufficiently and tends to be discharged easily.

In purification of $NO_x$ in exhaust gas, it is desirable that $NO_x$ is contacted with the SCR catalyst in a state that ratio of NO and $NO_2$ in exhaust gas is 1:1. It is because reaction rate of the above denitration reaction formula (3) is the fastest. Accordingly, the oxidation catalyst (DOC) for oxidizing HC and CO in exhaust gas, or the filter (DPF) for trapping combustible particulate components included in exhaust gas is arranged, as an NO oxidation means, at the first part of the present catalyst, relative to exhaust gas flow.

As the oxidation catalyst, such a catalyst can be used that has activated alumina, in which at least one kind from known platinum or palladium is supported, as a main component. It should be noted that as a substrate of the oxidation catalyst thereof, activated alumina including La can be used, and still more, a catalyst containing β-type zeolite on exchanged with cerium may be used.

In this way, it is preferable that DOC includes a platinum component or a palladium component as the noble metal component, and amount of this noble metal component is, in metal equivalent, preferably 0.1 to 4 g/L, and more preferably 0.5 to 3 g/L. The too high amount of the noble metal component leads to high cost while the too low amount may not provide suitable $NO_2/NO_x$ ratio in some cases.

In addition, it is preferable that this noble metal component includes 30 to 100% by weight of platinum, and more preferably 50 to 100% by weight of platinum in metal equivalent. In many cases, light oil to be used as fuel of a diesel automobile includes a sulfur component, and by exhaust gas including such a sulfur component, the noble metal in the catalyst component may result in to be poisoned in some cases, however, it has been known that palladium tends to be easily poisoned by sulfur, while platinum tends to be little poisoned by sulfur, therefore, it is preferable that the DOC to be used in the present invention uses platinum as a main component as the noble metal component.

It should be noted that combustible particle components captured using the DPF are then combusted and removed to reproduce DPF function. In combustion of soot in the DPF, $NO_2$ is used. Combustion of soot by $NO_2$ is milder as compared with oxygen, and thus difficult to induce damage of the DPF caused by combustion heat. There is such a type of the DPF that is covered with the oxidation catalyst with an object of promoting combustion reproduction, which is called CSF. In the present invention, unless otherwise specified, the DPF shall include the CSF.

At the latter part of the DOC and DPF, a spraying means for supplying a urea aqueous solution or an ammonia aqueous solution and the SCR catalyst are arranged. A combustion engine to which the present invention is applied includes, in the case of a diesel engine, from a compact car having about 1 L displacement, to a heavy duty diesel engine having over 50 L displacement, and $NO_x$ in exhaust gas discharged from such a diesel engine largely differs depending on an operating state thereof, a method for combustion control or the like. In addition, also the SCR catalyst to be used for purifying $NO_x$ in exhaust gas discharged from these diesel engines can be selected depending on versatility of displacement of the diesel engine from about 1 L to over 50 L.

In addition, as a means for purifying $NO_x$ in exhaust gas, other than the SCR, a $NO_x$ storage catalyst is used in some cases, and it is called LNT (Lean $NO_x$ Trap). $NO_x$ stored in the LNT purifies $NO_x$ using HC or CO, which is a reducing component in exhaust gas, as a reducing agent, however, the SCR may be combined with such an LNT.

In the present invention, as the selective catalytic reduction (SCR) catalyst, it is preferable to use the one where a catalyst layer including zeolite including at least an iron element, and a composite oxide substantially consisting of silica, tungsten oxide, ceria and zirconia is coated at the surface of the integral structure-type substrate. As the composite oxide, other than the composite oxide (C), which is a component of the present catalyst, a material removed with silica from this composite oxide (C) can also be used. As zeolite, which is a component of this SCR catalyst, zeolite (D) to be described next is preferable.

As for zeolite (D), it is preferable that Fe-β is included in an amount of 20 to 80% by weight, and more preferably 30 to 70% by weight, relative to total amount of zeolite. In addition, in the case of using by mixing Fe-β and Fe-+Ce-β, ratio of Fe-β and Fe-+Ce-β is preferably 20 to 50% by weight, and more preferably 20 to 40% by weight, relative to total amount of zeolite. Zeolite added with the iron element can be purchased from major zeolite makers as various grades, and in addition, it can be produced by a procedure described in JP-A-2005-502451 or the like. In addition, zeolite (5) is a denitration component including at least an iron element, and includes, for example, beginning with a p-type and an MFI-type zeolite having a 3D micropore structure, zeolite such as A, X, Y, or MOR.

In addition, composition of the composite oxide (C) is, similarly as described above, silica: 20% by weight or less: tungsten oxide: 1 to 50% by weight, ceria: 1 to 60% by weight, and zirconia: 30 to 90% by weight, and more preferably silica: 5% by weight or less: tungsten oxide: 3 to 30% by weight, ceria: 5 to 40% by weight, and zirconia: 50 to 90% by weight. Coated amount thereof is preferably set at 10 to 80% by weight relative to the whole: catalyst layer. It is because the coated amount less than 10% by weight, relative to total weight of the catalyst layer provides insufficient denitration performance, while the amount over 80% by weight is not capable of providing expected synergy effect with zeolite (C).

In addition, in the case where the reducing agent is urea, it is desirable that the SCR catalyst contains a composite oxide (E) as a hydrolysis component of the urea component, in addition to zeolite (C) or the composite oxide (C), which is the above denitration component. It is preferable that the composite oxide (E) is a composite oxide substantially consisting of titania, silica and zirconia. In addition, it is more preferable that composition thereof is titania: 70 to 95% by weight, silica: 1 to 10% by weight and zirconia: 5 to 20% by weight.

In addition, it is preferable that coated amount of the denitration component (C), the composite oxide (C) and the composite oxide (E) as the hydrolysis component of the urea, composing the catalyst layer, is 200 to 350 g/L, and more preferably 220 to 330 g/L. The too low coated amount may not provide sufficient denitration effect in some cases, while the too high amount could decrease engine performance, caused by generation of clogging of honeycomb holes or significant increase in backpressure of exhaust gas.

In addition, it is preferable that coated amount of zeolite (D) is 10 to 80% by weight, relative to the whole catalyst layer; coated amount of the composite oxide (C) is 10 to 80% by weight, relative to the whole catalyst layer; and coated amount of the composite oxide (E) is 1 to 30% by weight, relative to the whole catalyst layer.

In addition, the SCR catalyst may be coated on the integral structure-type substrate in a one-layered structure, or may be the one coated and laminated so as to attain a two or more-layered structure. It is preferable that a catalyst layer including zeolite (D) including at least an iron element, the composite oxide (C) consisting of substantially silica, tungsten oxide, ceria and zirconia, and the composite oxide (E) substantially consisting of titania, silica and zirconia is coated in upper and lower two layers at the surfaces of the integral structure-type substrate.

And, it is more preferable that the lower layer includes zeolite (D) in 50 to 90% by weight, the composite oxide (C) in 10 to 40% by weight, and the composite oxide (B) in 1 to 30% by weight, while the upper layer includes zeolite (D) in 10 to 40% by weight, the composite oxide (C) in 50 to 90% by weight, and the composite oxide (E) in 1 to 30% by weight. In this way, by increasing ratio of the zeolite (D) in the lower layer, and by increasing ratio of the composite oxide (B) in the upper layer, purification performance of $NO_x$ in exhaust gas can be enhanced.

In particular, it is preferable that the coated amount of the lower layer is 20 to 50% by weight of the total, and the coated amount of the upper layer is 50 to 80% by weight of the total. In this way, by increasing the coated amount of the upper layer relative to the coated amount of the lower layer, sufficiently high denitration performance can be attained. It is more preferable that the coated amount of the lower layer is 30 to 45% by weight of the total, and the coated amount of the upper layer is 55 to 70% by weight of the total.

Because the above SCR catalyst has superior denitration performance, ammonia can be more efficiently utilized as compared with a conventional catalyst.

In the present invention, at the latter part of the SCR catalyst, the present catalyst having $NH_3$ purification function is arranged. Because the present catalyst is superior in $NH_3$ purification performance, $NH_3$ slipping from the SCR catalyst can be oxidized efficiently, against exhaust gas flow.

When exhaust pas temperature is raised rapidly, for example, by rapid acceleration or the like in a state that $NH_3$ is adsorbed on the SCR catalyst, because eliminated $NH_3$ does not contribute to the $NO_x$ purification reaction at the SCR catalyst, $NH_3$ slip generates. Under such a use condition, the ammonia oxidation catalyst set up at the downstream of the SCR catalyst is also in a relatively low temperature state, however, the ammonia oxidation catalyst (AMOX) of the present invention is capable of effectively oxidizing and purifying $NH_3$, even by small amount of a noble metal.

In addition, at the same time of $NH_3$ oxidization and purification, the ammonia oxidation catalyst (AMOX) of the present invention is capable of suppressing discharge of $NO_x$, because of presence of the catalyst component having SCR function at the upper layer. That is, slipped $NH_3$ flows into the ammonia oxidation catalyst (AMOX), and a part thereof is adsorbed and held at the upper layer, or a part thereof passes through the upper layer and reaches the lower layer. $NH_3$ reached the lower layer is oxidized to the $NO_x$ components such as $N_2O$, NO, and $NO_2$ by the noble metal component (Pt) and these $NO_x$ transfer to the upper layer, react with $NH_3$ adsorbed and held at the upper layer, and discharged as $N_2$ and $H_2O$. Also at the catalyst component having SCR function included arbitrarily at the lower layer, $NH_3$ reached the lower layer is adsorbed and held, and $NO_x$ generated similarly by $NH_3$ oxidation reacts with them to be discharged as $N_2$ and $H_2O$.

Still more, to begin with, $NH_3$ flowing into the ammonia oxidation catalyst (AMOX) of the present invention is utilized in the SCR reaction, as described above, due to presence of the catalyst component having SCR function at the upper layer, $NH_3$ to be consumed in an oxidation reaction is less than $NH_3$ acquired. As a result, $N_2O$ by-produced by the oxidation reaction of $NH_3$ can also be suppressed.

In addition, temperature of exhaust gas discharged from an automotive diesel engine varies in a wide range, and in the case where it is classified that about 300° C. or lower is a low temperature region, as well as about 300° C. or higher is a high temperature region, the $NH_3$ oxidation catalyst of the present invention is superior in oxidation purification activity of $NH_3$ at the low temperature region, as well as suppresses by-production of $N_2O$, while at the high temperature region, where oxidation purification activity of $NH_3$ becomes nearly 100%, discharge of $NO_x$ can be suppressed, due to the above catalyst structure.

It should be noted that the purification apparatus or the purification method using the ammonia oxidation catalyst (AMOK) of the present invention is not limited to the above combination, that is, the aspect of DOC+DPE+spraying apparatus+SCR+AMOX. The ammonia oxidation catalyst (AMOX) of the present invention can be utilized as long as it is under condition where ammonia flows in.

For example, also the embodiment as SROC, described in PATENT LITERATURE 6: JP-A-2008-279334, is one type of the purification apparatus or the purification method using the ammonia oxidation catalyst (AMOX) of the present invention.

EXAMPLES

Characteristics of the present invention will be made further clearer below by showing Examples and Comparative examples. It should be noted that the present invention should not be limited to aspects of these Examples. It should be noted that catalyst to be used in the present Examples and Comparative Examples are prepared by a method to be shown next.

Example 1

Production of AMOX (1)

=The Lower Layer (Catalyst Layer Having $NH_3$ Oxidation Function)=

Titania powder A (87% by weight $TiO_2$/10% by weight $ZrO_2$/3% by weight $SiO_2$) and titania powder B (85% by weight $TiO_2$/10% by weight $SiO_3$/5% by weight $Al_2O_3$), as one kind of the composite oxide (A), were mixed, in advance, in a weight ratio of 19:9 to obtained titania mixed powder C, as a base material for supporting a noble metal. Then, by impregnating and supporting an aqueous solution of hexachloroplatinic(IV) acid, as a raw material of a noble metal component, onto this titania mixed powder C, Pt-supported titania mixed powder C (0.356% by weigh in Pt equivalent, equivalent to 0.1 g/L of Pt-supported amount per volume of a substrate of the final catalyst) was obtained.

The obtained Pt-supported titania mixed powder C (281 g), a binder (20 g), and water were put into a ball mill and milled till the specified particle size is attained to obtain slurry A for a NH$_3$ oxidation catalyst layer.

Subsequently, an integral structure-type substrate, that is, a honeycomb flow-through-type cordierite substrate (300 cells 5 mil, a diameter of 25.4 mm, a length of 24 mm), was immersed into this slurry, and coated so as to attain a catalyst supported amount of 30.1 g/L per unit volume, by a washcoat method, then dried at 150° C. for 1 hour and calcined at 500° C. for 2 hours under an air atmosphere to obtain a catalyst A already coated the lower catalyst layer.

=The Upper Layer (SCR Function Layer)=

Slurry B for an SCR function layer was obtained by putting 750 g of the composite oxide (C) (1% by weight SiO$_2$/10% by weight WO$_3$/23% by weight CeO$_2$/66% by weight ZrO$_2$), 250 g of an Fe ion exchanged zeolite (Fe ion exchanged amount; 2.2% by weight in Fe$_2$O$_3$ equivalent, BEA-type SAR=26), 40 g of a binder, and water, into a ball mill and milling till attaining the specified particle size.

Subsequently, the above catalyst A already coated the lower catalyst layer was immersed into this slurry B, and coated so as to attain a catalyst supported amount of 104 g/L per unit volume, by a washcoat method, then dried at 150° C. for 1 hour and calcined at 500° C. for 2 hours under an air atmosphere: to obtain the AMOX (1) shown in Table 1.

After that using the obtained NH$_3$ oxidation catalyst, the following catalyst performance evaluation was performed.

<Aging of a Catalyst>

Before catalyst performance evaluation, to intentionally deteriorate catalyst performance, heat treatment thereof was performed at 650° C. for 100 hours. The treatment was performed using an electric furnace, while passing through humidified air including 10% by volume of water.

<Catalyst Performance Evaluation> (NO$_x$/NH$_3$-Slip Evaluation)

Figure 2:
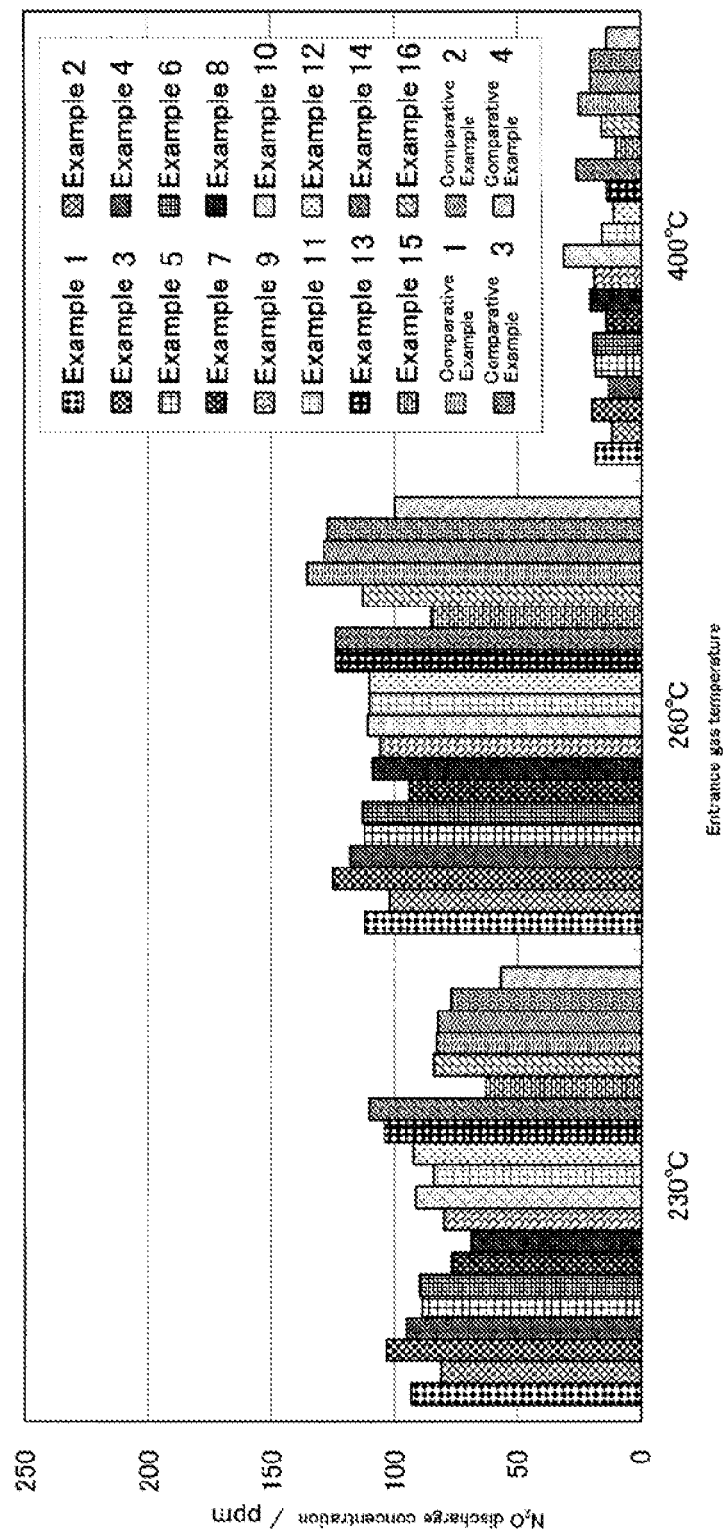
FIG. 2 is a graph representing $N_2O$ discharge concentration, in the case of using the ammonia oxidation catalyst of the present invention (Example) or a conventional ammonia oxidation catalyst (Comparative Example).
Figure 3:
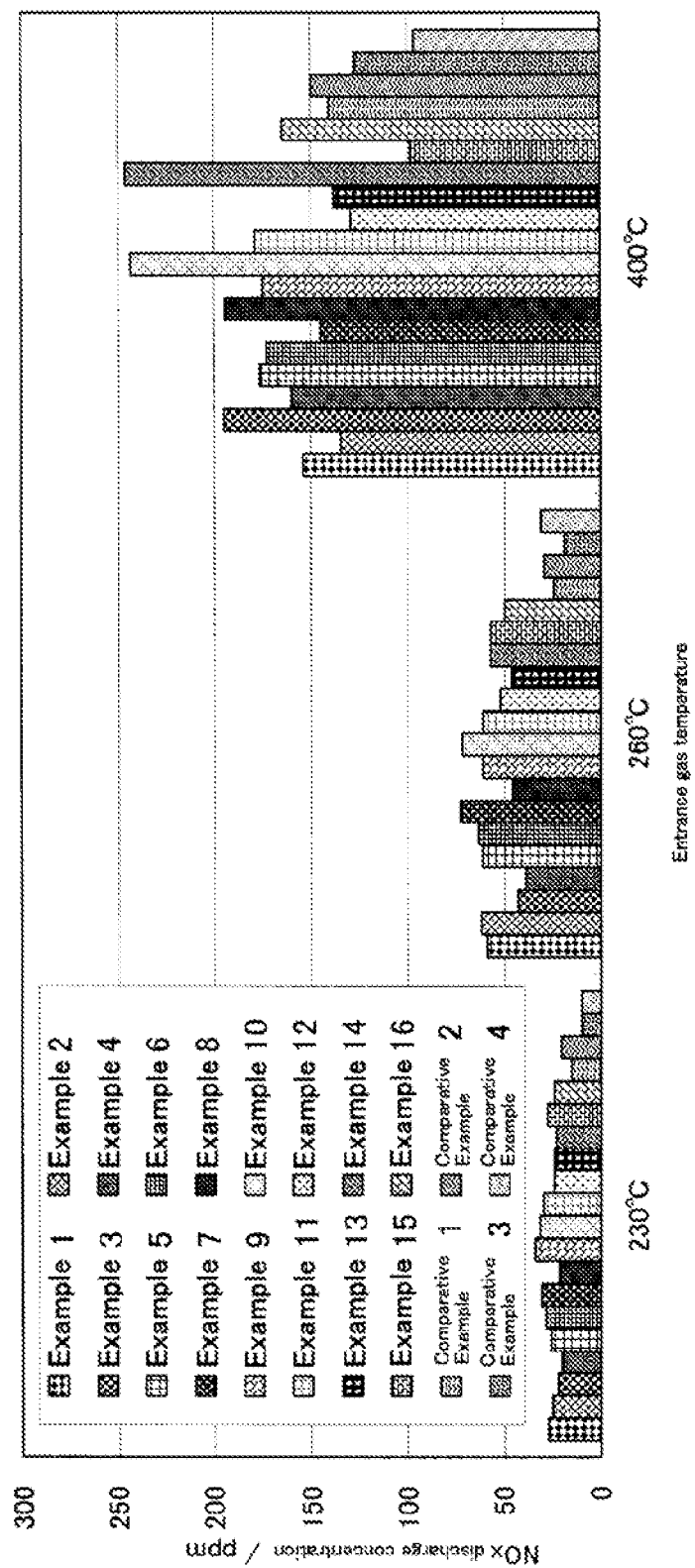
FIG. 3 is a graph representing $NO_x$ discharge concentration, in the case of using the ammonia oxidation catalyst of the present invention (Example) or a conventional ammonia oxidation catalyst (Comparative Example).

Under the measurement conditions described below, gas concentrations of NH$_3$, NO, NO$_2$, and N$_2$O) at the entrance and exit of the catalyst were measured to evaluate catalyst performance of the AMOX (1), using three indexes of NH$_3$ conversion, NO$_x$ discharge concentration, and N$_2$O discharge concentration. Results thereof are shown in FIGS. 1 to 3.

It should be noted that gas measurement was measured in the state that various gas components became stable, after the specified temperature was attained, and 20 minutes have passed after starting flow of gas with the specified concentration.

It should be noted that NH$_3$ conversion and NO$_x$ discharge concentration were calculated, based on the following formula for computation:

NH$_3$ conversion [%]=[{(NH$_3$ concentration at the entrance)−(NH$_3$ concentration at the exit)}/(NH$_3$ concentration at the entrance)]×100

NO$_x$ discharge concentration[ppm]=(NO concentration at the exit)+(NO$_2$ concentration at the exit)

<Measurement Conditions>

Evaluation equipment; A model has test equipment (manufactured by MHI Solution Technologies, Co., Ltd.)

Quantitative analysis equipment; FTIR (NEXUS-670 with a 2 m gas cell, manufactured by Thermo Electron Co., Ltd.)

Catalyst size; φ2.5.4 mm×24 mm, 300 cells/5 mill, 12.2 mL/unit

Space velocity; 100,000/h

Total gas flow rate; 20.3 L/min

Model gas composition; (refer to Table 2)

Example 2

Production of AMOX (2)

AMOX (2) shown in Table 1 was obtained similarly by the method described in Example 1, except by changing noble metal concentration of Pt-supported titania powder, setting a Pt supported amount per unit volume of the final catalyst to 0.03 g/L, setting an amount of the Pt-supported titania powder to be charged into a ball mill to 280.3 g, so as to attain a catalyst supported amount per unit volume of the lower layer of 30.03 g/L. Evaluation results of this catalyst performance are shown in FIGS. 1 to 3.

Example 3

Production of AMOX (3)

AMOX (3) shown in Table 1 was obtained similarly by the method described in Example 1, except by changing amount of the composite oxide (C) (1% by weight of SiO$_2$/10% by weight of WO$_3$/23% by weight of CeO$_2$/66% by weight of ZrO$_2$) to 500 g, and amount of the Fe ion exchanged zeolite (Fe ion exchanged amount; 2.2% by weight in FeO equivalent, BEA-type, SAR=25) to 500 g, to be charged into a ball mill, to obtain slurry for the upper layer. Evaluation results of this catalyst performance are shown in FIGS. 1 to 3.

Example 4

Production of AMOX (4)

AMOX (4) shown in Table 1 was obtained similarly by the method described in Example 1, except by changing amount of the composite oxide (C) (1% by weight of SiO$_2$/10% by weight of WO$_3$/23 by weight of CeO$_2$/66% by weight of ZrO$_2$) to 250 g, and amount of the Fe ion exchanged zeolite (Fe ion exchanged amount; 2.2% by weight in Fe$_2$O$_3$ equivalent, BEA-type, SAR=26) to 750 g, to be charged into a ball mill, to obtain slurry for the upper layer. Evaluation results of this catalyst performance are shown in FIGS. 1 to 3.

Example 5

Production of AMOX (5)

AMOX (5) shown in Table 1 was obtained similarly by the method described in Example 1, except by changing amount of the composite oxide (C) (1% by weight of SiO$_2$/10% by weight of WO$_3$/23 by weight of CeO$_2$/66% by weight of ZrO$_2$) to 850 g, and amount of the Fe ion exchanged zeolite (Fe ion exchanged amount; 2.2% by weight in FeO$_3$ equivalent, BEA-type, SAR=26) to 150 g, to be charged into a ball mill, to obtain slurry for the upper layer. Evaluation results of this catalyst performance are shown in FIGS. 1 to 3.

Example 6

Production of AMOX (6)

AMOX (6) shown in Table 1 was obtained similarly by the method described in Example 1, except by changing amount of the composite oxide (C) (1% by weight of SiO$_2$/10% by weight of WO$_3$/23% by weight of CeO$_2$/66% by weight of ZrO$_2$) to 950 g, and amount of the Fe ion exchanged zeolite (Fe ion exchanged amount; 2.2% by weight in $Fe_2O_3$ equivalent, BEA-type, SAR=26) to 50 g, to be charged into a ball mill, to obtain slurry for the upper layer. Evaluation results of this catalyst performance are shown in FIGS. 1 to 3.

Example 7

Production of AMOX (7)

AMOX (7) shown in Table 1 was obtained similarly by the method described in Example 5, except by changing noble metal concentration of Pt-supported titania powder, so as to attain a Pt supported amount of 0.05 g/L, per unit volume of the final catalyst, an amount of the Pt-supported titania powder, to be charged into a ball mill, of 280.5 g, and a catalyst supported amount of 30.05 g/L, per unit volume of the lower layer. Evaluation results of this catalyst performance are shown in FIGS. 1 to 3.

Example 8

Production of AMOX (8)

=The Lower Layer (Catalyst Layer Having $NH_3$ Oxidation Function)=

Titania powder A (57% by weight $TiO_2$/10% by weight $ZrO_2$/3% by weight $SiO_2$), as one kind of the composite oxide (A) was impregnation supported with an aqueous solution of platinum chloride, to obtain Pt-supported titania powder (0.332% by weigh in Pt equivalent, equivalent to 0.1 g/L of Pt-supported amount per volume of a substrate of the final catalyst). The obtained Pt-supported titania powder and water were put into a ball mill and milled till the specified particle size is attained to obtain slurry C for a $NH_3$ oxidation catalyst layer.

Subsequently, an integral structure-type substrate, that is, a honeycomb flow-through-type cordierite substrate (300 cells 5 mil, a diameter of 25.4 mm, a length of 24 mm), was immersed into this slurry C, and coated so as to attain a catalyst supported amount of 30.1 g/L per unit volume, by a washcoat method, then dried at 150° C. for 1 hour and calcined at 500° C. for 2 hours under an air atmosphere to obtain a catalyst B already coated the lower layer.

=The Upper Layer (SCR Function Layer)=

Slurry D for an SCR function layer was obtained by putting 1000 g of the composite oxide (C) (1% by weight $SiO_2$/10% by weight $WO_3$/23% by weight $CeO_2$/66% by weight $ZrO_2$) and 120 g of a binder, and water, into a ball mill and milling till attaining the specified particle size.

Subsequently, the above catalyst B already coated the lower layer was immersed into this slurry C, and coated so as to attain a catalyst supported amount of 112 g/L per unit volume, by a washcoat method, then dried at 150° C. for 1 hour and calcined at 500° C. for 2 hours under an air atmosphere to obtain the AMOX (8) shown in Table 1. Evaluation results of this catalyst performance are shown in FIGS. 1 to 3.

Example 9

Production of AMOX (9)

AMOX (9) shown in Table 1 was obtained similarly by the method described in Example 8, except by using titania powder D (97% by weight of $TiO_2$/3% by weight of $SiO_2$) instead of titania powder A (87% by weight of $TiO_2$/10% by weight of $ZrO_2$/3% by weight of $SiO_2$), which is a kind of the composite oxide (A). Evaluation results of this catalyst performance are shown in FIGS. 1 to 3.

Example 10

Production of AMOX (10)

AMOX (10) shown in Table 1 was obtained similarly by the method described in Example 8, except by using the composite oxide (B) powder (98.5% by weight of $Al_2O_3$/1.5% by weight of $SiO_2$), instead of titania powder A (87% by weight of $TiO_2$/10% by weight of $ZrO_2$/3% by weight of $SiO_2$). Evaluation results of this catalyst performance are shown in FIGS. 1 to 3.

Example 11

Production of AMOX (11)

AMOX (11) shown in Table 1 was obtained by coating the lower layer slurry C of Example 8 by a washcoat method, and then coating the upper layer slurry B of Example 1 by a washcoat method. Evaluation results of this catalyst performance are shown in FIGS. 1 to 3.

Example 12

Production of AMOX (12)

=The Lower Layer (Catalyst Layer Having $NH_3$ Oxidation Function)=

Titanic powder A (87% by weight $TiO_2$/10% by weight $ZrO_2$/3% by weight $SiO_2$), as one kind of the composite oxide (A), was impregnation supported with an aqueous solution of platinum chloride, as a raw material of a noble metal component to obtain Pt-supported titanic mixed powder C (0.398% by weigh in Pt equivalent, equivalent to 0.1 g/L of Pt-supported amount per volume of a substrate of the final catalyst).

The obtained Pt-supported titania powder A (251 g), 50 g of the Fe ion exchanged zeolite (Fe ion exchanged amount; 2.2% by weight in $Fe_3O_3$ equivalent, BEA-type, SAR=26), a binder (30 g) and water were put into a ball mill and milled till the specified particle size is attained to obtain slurry E for a $NH_3$ oxidation catalyst layer.

Subsequently, an integral structure-type substrate, that is, a honeycomb flow-through-type cordierite substrate (300 cells 5 mil, a diameter of 25.4 mm, a length of 24 mm), was immersed into this slurry E, and coated so as to attain a catalyst supported amount of 33.1 g/L per unit volume, by a washcoat method, then dried at 150° C. for 1 hour and calcined at 500° C. for 2 hours under an air atmosphere to obtain a catalyst C already coated the lower catalyst layer.

The AMOX (12) shown in Table 1 was obtained by coating the upper layer similarly as in Example 1 by the washcoat method, using this catalyst C already coated the lower catalyst layer. Evaluation results of this catalyst performance are shown in FIGS. 1 to 3.

Example 13

Production of AMOX (13)

=The Lower Layer (Catalyst Layer Having $NH_3$ Oxidation Function)=

Titania powder A (87% by weight $TiO_2$/10% by weight $ZrO_2$/3% by weight $SiO_2$), as one kind of the composite oxide (A), was impregnation supported with an aqueous solution of platinum chloride, as a raw material of a noble metal component to obtain Pt-supported titania mixed powder C (0.498% by weigh in Pt equivalent, equivalent to 0.1 g/L of Pt-supported amount per volume of a substrate of the final catalyst).

The obtained Pt-supported titania powder A (201 g), 100 g of the composite oxide (C) (1% by weight $SiO_2$/10% by weight $WO_3$/23% by weight $CeO_2$/66% by weight $ZrO_2$), a binder (30 g) and water were put into a ball mill and milled till the specified particle size is attained to obtain slurry F for a $NH_3$ oxidation catalyst layer.

Subsequently, an integral structure-type substrate, that is, a honeycomb flow-through-type cordierite substrate (300 cells 5 mil, a diameter of 25.4 mm, a length of 24 mm), was immersed into this slurry F, and coated so as to attain a catalyst supported amount of 33.1 g/L per unit volume, by a washcoat method, then dried at 150° C. for 1 hour and calcined at 500° C. for 2 hours under an air atmosphere to obtain a catalyst D already coated the lower catalyst layer.

The AMOX (13) shown in Table 1 was obtained by coating the upper layer similarly as in Example 1 by the washcoat method, using this catalyst C already coated the lower catalyst layer. Evaluation results of this catalyst performance are shown in FIGS. 1 to 3.

Example 14

Production of AMOX (14)

Titania powder D (97% by weight $TiO_2$/3% by weight Si(D) impregnation supported with an aqueous solution of platinum chloride to obtain Pt-supported titania powder (1.316% by weigh in Pt equivalent, equivalent to 0.4 g/L of Pt-supported amount per volume of a substrate of the final catalyst) 304 g of the obtained Pt-supported titania powder, 300 g of the composite oxide (C) (1% by weight $SiO_2$/10% by weight $WO_3$/23% by weight $CeO_2$/66% by weight $ZrO_2$), and 30 g of a binder, together with water, were put into a ball mill and milled till the specified particle, size is attained to obtain slurry C for a $NH_3$ oxidation catalyst layer.

Subsequently, an integral structure-type substrate, that is, a honeycomb flow-through-type cordierite substrate (300 cells 5 mil, a diameter of 25.4 mm, a length of 24 mm), was immersed into this slurry G, and coated so as to attain a catalyst supported amount of 63.4 g/L per unit volume, by a washcoat method, then dried at 150° C. for 1 hour and calcined at 500° C. for 2 hours under an air atmosphere to obtain a catalyst E already coated the lower catalyst layer.
=The Upper Layer (SCR Function Layer)=

Slurry H for an SCR function layer was obtained by putting 900 g of the composite oxide (C) (1% by weight $SiO_2$/10% by weight $WO_3$/23% by weight $CeO_2$/66% by weight $ZrO_2$), 300 g of an Fe ion exchanged zeolite (Fe ion exchanged amount; 2.2% by weight in $Fe_2O_3$ equivalent, BEA-type, SAR=26), and 40 g of a binder, and water, into a bail mill and milling till attaining the specified particle size.

Subsequently, the above catalyst E already coated the lower catalyst layer was immersed into this slurry H, and coated so as to attain a catalyst supported amount of 124 g/L per unit volume, by a washcoat method, then dried at 150° C. for 1 hour and calcined at 500° C. for 2 hours under an air atmosphere to obtain the AMOX (14) shown in Table 1. Evaluation results of this catalyst performance are shown in FIGS. 1 to 3.

Example 15

Production of AMOX (15)

AMOX (15) shown in Table 1 was obtained similarly by the method described in Example 12, except by changing noble metal concentration of Pt-supported titania powder of the lower layer, setting Pt supported amount per unit volume of the final catalyst to 0.03 g/L, changing an amount of the Pt-supported titania powder to be charged into a ball mill to 250.3 q, and setting amount of Fe ion exchanged zeolite (Fe ion exchanged amount; 2.2% by weight in $Fe_2O_3$ equivalent, BEA-type, SAR=26), to be added to slurry for the lower layer to 20 g. Evaluation results of this catalyst performance are shown in FIGS. 1 to 3.

Example 16

Production of AMOX (16)

AMOX (16) shown in Table 1 was obtained similarly by the method described in Example 11, except by using alumina powder D (100% by weight of $Al_2O_3$), instead of titanic powder A (87% by weight of $TiO_2$/10% by weight of $ZrO_2$/3% by weight of $SiO_2$). Evaluation results of this catalyst performance are shown in FIGS. 1 to 3.

TABLE 1

| | | | AMOX catalyst composition | | | | | | | | |
|---|---|---|---|---|---|---|---|---|---|---|---|
| | | | Composite oxide A Titania powder | | | | | Composite | Composite | Fe | | |
| Unit of numerical value (g/L) | | Pt | A | B | D | E | Alumina | amide (B) | oxide (C) | zeolite | Binder | Ceria |
| Example 1 | upper layer | | | | | | | | 75 | 25 | 4 | |
| AMOX (1) | lower layer | 0.1 | 19 | 9 | | | | | | | 2 | |
| Example 2 | upper layer | | | | | | | | 75 | 25 | 4 | |
| AMOX (2) | lower layer | 0.03 | 19 | 9 | | | | | | | 2 | |
| Example 3 | upper layer | | | | | | | | 50 | 50 | 4 | |
| AMOX (3) | lower layer | 0.1 | 19 | 9 | | | | | | | 2 | |
| Example 4 | upper layer | | | | | | | | 25 | 75 | 4 | |
| AMOX (4) | lower layer | 0.1 | 19 | 9 | | | | | | | 2 | |
| Example 5 | upper layer | | | | | | | | 85 | 15 | 4 | |
| AMOX (5) | lower layer | 0.1 | 19 | 9 | | | | | | | 2 | |
| Example 6 | upper layer | | | | | | | | 95 | 5 | 4 | |
| AMOX (6) | lower layer | 0.1 | 19 | 9 | | | | | | | 2 | |
| Example 7 | upper layer | | | | | | | | 85 | 15 | 4 | |
| AMOX (7) | lower layer | 0.05 | 19 | 9 | | | | | | | 2 | |

TABLE 1-continued

AMOX catalyst composition

| Unit of numerical value (g/L) | | Pt | A | B | D | E | Alumina | Composite amide (B) | Composite oxide (C) | Fe zeolite | Binder | Ceria |
|---|---|---|---|---|---|---|---|---|---|---|---|---|
| Example 8 | upper layer | | | | | | | 100 | | | 12 | |
| AMOX (8) | lower layer | 0.1 | 30 | | | | | | | | | |
| Example 9 | upper layer | | | | | | | 100 | | | 12 | |
| AMOX (9) | lower layer | 0.1 | | 30 | | | | | | | | |
| Example 10 | upper layer | | | | | | | 100 | | | 12 | |
| AMOX (10) | lower layer | 0.1 | | | | 30 | | | | | | |
| Example 11 | upper layer | | | | | | | 75 | | 25 | 4 | |
| AMOX (11) | lower layer | 0.1 | 30 | | | | | | | | | |
| Example 12 | upper layer | | | | | | | 75 | | 25 | 4 | |
| AMOX (12) | lower layer | 0.1 | 25 | | | | | | 5 | | 3 | |
| Example 13 | upper layer | | | | | | | 75 | | 25 | 4 | |
| AMOX (13) | lower layer | 0.1 | 20 | | | | | 10 | | | 3 | |
| Example 14 | upper layer | | | | | | | 90 | | 30 | 4 | |
| AMOX (14) | lower layer | 0.4 | | 30 | | | | | 30 | | 3 | |
| Example 15 | upper layer | | | | | | | 75 | | 25 | 4 | |
| AMOX (15) | lower layer | 0.03 | 25 | | | | | | | 2 | 3 | |
| Example 16 | upper layer | | | | | | | 75 | | 25 | 4 | |
| AMOX (16) | lower layer | 0.1 | | | | 30 | | | | | | |
| Comatrative Example. 1 AMOX (17) | upper layer | | | | | | | | | 100 | 10 | 2 |
| | lower layer | 1.0 | | | 44 | | | | | 30 | 10 | |
| Comatrative Example. 2 AMOX (18) | upper layer | | | | | | | | | 100 | 10 | 2 |
| | lower layer | 0.7 | | | 44 | | | | | 30 | 10 | |
| Comatrative Example. 3 AMOX (19) | upper layer | | | | | | | | | 100 | 10 | 2 |
| | lower layer | 0.5 | | | 44 | | | | | 30 | 10 | |
| Comatrative Example. 4 AMOX (20) | upper layer | | | | | | | | | 100 | 10 | 2 |
| | lower layer | 0.1 | | | 44 | | | | | 30 | 10 | |

TABLE 2

| Model gas composition | | | | | |
|---|---|---|---|---|---|
| Evaluation temperature | °C. | 230 | 260 | 400 | |
| gas concentration | $NH_3$ | ppm | 500 | 500 | 300 |
| | NO | ppm | 0 | 0 | 150 |
| | $NO_2$ | ppm | 0 | 0 | 150 |
| | $H_2O$ | % | 5 | 5 | 5 |
| | $O_2$ | % | 10 | 10 | 10 |
| | $N_2$ | | balance | balance | balance |

Comparative Example 1

Catalyst performance was evaluated similarly as in Example 1, by setting the ammonia oxidation catalyst AMOX (17) prepared by the following method, instead of the above ammonia oxidation catalyst AMOX (1), in the model gas test equipment. Evaluation results of this catalyst performance are shown in FIGS. 1 to 3.

Production of a $NH_3$ Oxidation Catalyst ANON (17)

=The Lower Layer (Catalyst Layer Having $NH_3$ Oxidation Function)=

Pt-supported titania powder (2.22% by weight in Pt equivalent, equivalent to 1.0 g/L of Pt-supported amount per volume of a substrate of the final catalyst) was obtained by impregnating and supporting an aqueous solution of platinum chloride, as a raw material of a noble metal component, onto titania powder E (90 wt % $TiO_2$/10 wt % $SiO_2$, BET value: 100 m$^2$/g), as a base material.

450 g of the obtained Pt-supported titania powder, 100 g of a β-type zeolite ion exchanged with an iron element (Fe ion exchange amount; 1.76% by weight (in $Fe_2O_3$ equivalent), SAR=28), 200 g of an MFI-type zeolite ion exchanged with an iron element (Fe ion exchange amount; 1.35% by weight (in $Fe_2O_3$ equivalent), SAR=23), and 100 g of a binder, and water, were put into a ball mill and milled till the specified particle size is attained to obtain slurry I for a $NH_3$ oxidation catalyst layer.

Subsequently, an integral structure-type substrate, that is, a honeycomb flow-through-type cordierite substrate (300 cells/5 mil, a diameter of 25.4 mm, a length of 24 mm), was immersed into this slurry I, and coated so as to attain a catalyst supported amount of 85 g/L per unit volume, by a washcoat method, they dried at 150° C. for 1 hour and calcined at 500° C. for 2 hours under an air atmosphere to obtain a catalyst F already coated the lower catalyst layer. The obtained catalyst F already coated the lower catalyst layer, in this way, has Pt supported in an amount of 1.0 g/L per unit volume.

=The Upper Layer (SCR Function Layer)=

Slurry J for coating of an SCR function layer was obtained by putting 400 g of the β-type zeolite ion exchanged with an iron element (Fe ion exchange amount; 1.76% by weight (in $Fe_2O_3$ equivalent), SAR=28), 600 g of the MFI-type zeolite ion exchanged with an iron element (Fe ion exchange amount; 1.35% by weight (in $Fe_2O_3$ equivalent), SAR=23), 20 g of cerium oxide (BET value: 150 m$^2$/g), and 100 g of a binder, and water, into a ball mill and milling till attaining the specified particle size.

Subsequently, the catalyst F already coated the lower catalyst layer was immersed into this slurry J, and coated so as to attain a catalyst supported amount of 112 g/L per unit volume, by a washcoat method, then dried at 150° C. for 1 hour and calcined at 500° C. for 2 hours under an air atmosphere to obtain a Comparative AMOX (17) shown in Table 1.

Comparative Example 2

Comparative AMOX (18) shown in Table 1 was obtained similarly by the method described in Comparative Example 1, except by changing noble metal concentration of Pt-supported titania powder, so as to attain a Pt supported amount of 0.7 g/L, per unit volume of the final catalyst, and an amount of the Pt-supported titanic powder, to be charged into a ball mill, of 447 g. Catalyst performance was evaluated similarly by setting in the model gas test equipment. Evaluation results of this catalyst performance are shown in FIGS. 1 to 3.

Comparative Example 3

Comparative AMOX (19) shown in Table 1 was obtained similarly by the method described in Comparative Example 1, except by changing noble metal concentration of Pt-supported titania powder, so as to attain a Pt supported amount of 0.5 g/L, per unit volume of the final catalyst, and an amount of the Pt-supported titanic powder, to be charged into a ball mill, of 445 g. Catalyst performance was evaluated similarly by setting in the model gas test equipment. Evaluation results of this catalyst performance are shown in FIGS. 1 to 3.

Comparative Example 4

Comparative AMOX (20) shown in Table 1 was obtained similarly by the method described in Comparative Example 1, except by changing noble metal concentration of Pt-supported titania powder, so as to attain a Pt supported amount of 0.1 g/L, per unit volume of the final catalyst, and an amount of the Pt-supported titanic powder, to be charged into a ball mill, of 441 g. Catalyst performance was evaluated similarly by setting in the model gas test equipment. Evaluation results of this catalyst performance are shown in FIGS. 1 to 3.
Evaluation As shown in FIG. 1, it is understood that Examples 1 to 16 are superior in $NH_3$ conversion, particularly at low temperature (230° C.), in spite of having low Pt amount, as compared with the ammonia oxidation catalysts AMOX (17) of Comparative Example 1, because the ammonia oxidation catalysts AMOX (1) to (16) include the specific composite oxide, as a catalyst component of the present invention. In addition, as shown in FIG. 2, when discharge concentration of $N_2O$ at 260° C., where discharge concentration is higher as compared with other evaluation temperature, is compared, it is equal or suppressed low in Examples 1 to 16 as compared with the ammonia oxidation catalyst (17) of Comparative Example 1. In addition, as for a by-production state of $NO_x$, which is a harmful substance, as shown in FIG. 3, it has been understood that, in evaluation result at 400° C., including $NO_x$ as gas composition, measured concentration of $NO_x$ flown out from the catalyst is lower than NOx concentration in gas flowing into the catalyst, that is 300 ppm, although a sufficiently higher $NH_3$ conversion of 90% or higher is obtained. This shows that the ammonia oxidation catalysts AMOX (1) to (16) of Examples 1 to 16 suppress $NO_x$ discharge it has been confirmed that slipped $NH_3$ is purified in high efficiency, even under low noble metal supported amount as compared with conventional technology, as well as by-production of $N_2O$ or generation of new $NO_x$ accompanied with oxidation of $NH_3$, is suppressed.

From the above results, the ammonia oxidation catalysts, including the specific composite oxide as a catalyst component of the present invention, have suppression capability of by-production of $N_2O$ or $NO_x$, as well as are capable of enhancing purification performance of $NH_3$, under condition of reduced usage of Pt, as compared with the conventional ammonia oxidation catalysts.

INDUSTRIAL APPLICABILITY

The present invention is widely applicable to removal technology of nitrogen oxides discharged from an automobile, such as a diesel engine, and also to purification of slipped $NH_3$. In addition, it is applicable also to exhaust gas discharged from a combustion engine using, as fuel, beginning with gasoline and heavy oil other than light oil, as well as bio-fuel such as alcohol, mixed fuel of bio-fuel and light oil, or mixed fuel of bio-fuel and gasoline. Still more, the present invention exerts effect also in application to an exhaust gas purification catalyst apparatus accompanying with reproduction of a filter deposited with combustible particle components.

The invention claimed is:

1. An ammonia oxidation catalyst (AMOX) for oxidizing and removing surplus ammonia, in selectively reducing nitrogen oxides by adding urea or ammonia as a reducing agent of the nitrogen oxides and using a selective catalytic reduction (SCR) catalyst, into exhaust gas discharged from a lean-burn engine,
comprising at least two catalyst layers having a catalyst layer (lower layer) comprising a noble metal element supported on an inorganic base material comprising any of a composite oxide (A) having at least titania and silica as main components, alumina, and a composite oxide (B) consisting of alumina and silica, and a catalyst layer (upper layer) comprising a composite oxide (C) consisting of at least silica, tungsten oxide, ceria, and zirconia, coated at the surface of a honeycomb structure-type substrate, wherein the composite oxide (C) comprises silica: 20% by weight or less, tungsten oxide: 1 to 50% by weight, ceria: 1 to 60% by weight, and zirconia: 30 to 90% by weight.

2. The ammonia oxidation catalyst according to claim 1, wherein the composition of the composite oxide (A) is titania: 60 to 99% by weight and silica: 1 to 40% by weight.

3. The ammonia oxidation catalyst according to claim 2, wherein the composite oxide (A) further comprises zirconia or alumina, and the content thereof is 30% by weight or less.

4. The ammonia oxidation catalyst according to claim 1, wherein the composite oxide (A) further comprises zirconia or alumina, and the content thereof is 30% by weight or less.

5. The ammonia oxidation catalyst according to claim 1, wherein composition of the composite oxide (B) is alumina: 70 to 99.9% by weight and silica: 0.1 to 30% by weight.

6. The ammonia oxidation catalyst according to claim 1, wherein composition of the composite oxide (C) is silica: 0.1 to 5% by weight, tungsten oxide: 3 to 30% by weight, ceria: 5 to 40% by weight, and zirconia: 50 to 90% by weight.

7. The ammonia oxidation catalyst according to claim 1, wherein the catalyst layer (lower layer) further comprises the composite oxide (C) or zeolite (D).

8. The ammonia oxidation catalyst according to claim 7, wherein zeolite (D) comprises at least iron and content thereof is 0.1 to 5% by weight in $Fe_2O_3$ equivalent.

9. The ammonia oxidation catalyst according to claim 7, wherein coated amount of the composite oxide (C) or zeolite (D) of the catalyst layer (lower layer), is 120 g/L or less per unit volume of the honeycomb structure-type substrate.

10. The ammonia oxidation catalyst according to claim 1, wherein the catalyst layer (upper layer) further comprises zeolite (D).

11. The ammonia oxidation catalyst according to claim 10, wherein coated amount of zeolite (D) of the catalyst layer (upper layer) is 150 g/L or less per unit volume of the honeycomb structure-type substrate.

12. The ammonia oxidation catalyst according to claim 10, wherein zeolite (D) comprises at least iron and content thereof is 0.1 to 5% by weight in $Fe_2O_3$ equivalent.

13. The ammonia oxidation catalyst according to claim 1, wherein the noble metal element to be supported is platinum.

14. The ammonia oxidation catalyst according to claim 1, wherein content of the noble metal element to be supported on an inorganic base material comprising any of the composite oxide (A), alumina, and the composite oxide (B), is 0.01 to 1.0 g/L per unit volume of the honeycomb structure-type substrate.

15. The ammonia oxidation catalyst according to claim 1, wherein coated amount of the inorganic base material comprising any of the composite oxide (A), alumina, and the composite oxide (B) of the catalyst layer (lower layer), is 10 to 60 g/L per unit volume of the honeycomb structure-type substrate.

16. The ammonia oxidation catalyst according to claim 1, wherein coated amount of the composite oxide (C) of the catalyst layer (upper layer), is 10 to 150 g/L per unit volume of the honeycomb structure-type substrate.

17. An exhaust gas purification apparatus, comprising an oxidation catalyst (DOC) having oxidation function of nitrogen monoxide and hydrocarbons, a filter (DPF) for removing particulate matters by trapping and combusting them, a spraying means for supplying a urea aqueous solution or an ammonia aqueous solution, a selective catalytic reduction (SCR) catalyst, and the ammonia oxidation catalyst (AMOX) according to claim 1 arranged in this order, in an exhaust gas passage.

18. The exhaust gas purification apparatus according to claim 17, wherein the selective catalytic reduction (SCR) catalyst is made by coating a catalyst layer comprising zeolite (D) comprising at least an iron element, and a composite oxide (C) consisting of at least silica, tungsten oxide, ceria, and zirconia, on the surface of the integral structure-type substrate.

19. An exhaust gas purification method, comprising passing the exhaust gas discharged from a lean-burn engine through the oxidation catalyst (DOC) and the filter (DPF), purifying hydrocarbon components and carbon monoxide in exhaust gas, as well as converting many of nitrogen monoxide to nitrogen dioxide, thereafter spray supplying the urea aqueous solution or the ammonia aqueous solution and passing through the selective catalytic reduction (SCR) catalyst to reduce nitrogen oxides in the exhaust gas, and further passing through the ammonia oxidation catalyst (AMOX) to oxidize and remove surplus ammonia, using the exhaust gas purification apparatus according to claim 18.

20. An exhaust gas purification method, comprising passing the exhaust gas discharged from a lean-burn engine through the oxidation catalyst (DOC) and the filter (DPF), purifying hydrocarbon components and carbon monoxide in exhaust gas, as well as converting many of nitrogen monoxide to nitrogen dioxide, thereafter spray supplying the urea aqueous solution or the ammonia aqueous solution and passing through the selective catalytic reduction (SCR) catalyst to reduce nitrogen oxides in the exhaust gas, and further passing through the ammonia oxidation catalyst (AMOX) to oxidize and remove surplus ammonia, using the exhaust gas purification apparatus according to claim 17.

21. An ammonia oxidation catalyst (AMOX) for oxidizing and removing surplus ammonia, in selectively reducing nitrogen oxides by adding urea or ammonia as a reducing agent of the nitrogen oxides and using a selective catalytic reduction (SCR) catalyst, into exhaust gas discharged from a lean-burn engine, produced by coating at least two catalyst layers having a catalyst layer (lower layer) comprising a noble metal element supported on an inorganic base material comprising any of a composite oxide (A) having at least titania and silica as main components, alumina, and a composite oxide (B) consisting of alumina and silica, and a catalyst layer (upper layer) comprising a composite oxide (C) consisting of at least silica, tungsten oxide, ceria, and zirconia, at the surface of a honeycomb structure-type substrate,
wherein the composite oxide (C) comprises silica: 20% by weight or less, tungsten oxide: 1 to 50% by weight, ceria: 1 to 60% by weight, and zirconia: 30 to 90% by weight.

* * * * *